(12) United States Patent
Liu et al.

(10) Patent No.: US 6,493,139 B1
(45) Date of Patent: Dec. 10, 2002

(54) OPTICAL SWITCH

(76) Inventors: Hongdu Liu, 48277 Hackberry, Fremont, CA (US) 94539; Daxin Liu, 104 Magnolia La., Mountain View, CA (US) 94043; Shizhuo Yin, 37950 Fremont Blvd., #29, Fremont, CA (US) 94536; Lee Lisheng Huang, 1642 Peacock Ave., Sunnyvale, CA (US) 94087

( * ) Notice: Subject to any disclaimer, the term of this patent is extended or adjusted under 35 U.S.C. 154(b) by 39 days.

(21) Appl. No.: 09/811,138

(22) Filed: Mar. 16, 2001

(51) Int. Cl.[7] .......................... G02B 27/28; G02B 6/26; G02F 1/03; H04J 14/02
(52) U.S. Cl. ...................... 359/484; 359/256; 359/320; 359/301; 359/117; 359/127; 385/16; 385/17
(58) Field of Search .................. 359/249–252, 359/255, 256, 279, 280–283, 301, 303, 320, 483, 484, 117, 127, 128; 385/16, 17

(56) References Cited

U.S. PATENT DOCUMENTS

| | | | | |
|---|---|---|---|---|
| 4,461,543 A | * | 7/1984 | McMahon | 385/17 |
| 5,204,771 A | * | 4/1993 | Koga | 359/281 |
| 5,414,541 A | * | 5/1995 | Patel et al. | 359/256 |
| 5,694,233 A | * | 12/1997 | Wu et al. | 359/117 |
| 5,912,748 A | * | 6/1999 | Wu et al. | 359/117 |
| 5,933,269 A | * | 8/1999 | Robinson | 359/280 |
| 6,005,697 A | * | 12/1999 | Wu et al. | 359/117 |
| 6,173,092 B1 | * | 1/2001 | Bergmann | 359/117 |
| 6,175,432 B1 | * | 1/2001 | Wu et al. | 359/122 |
| 2002/0003651 A1 | * | 1/2002 | Sui | 359/280 |
| 2002/0009254 A1 | * | 1/2002 | Sui | 385/16 |

* cited by examiner

Primary Examiner—Evelyn A Lester

(57) ABSTRACT

The present invention relates to optical switches in which switching occurs by changing the rotation of the plane of polarization by application of an externally applied control signal, particularly to magneto-optical switches controlling the port by which light emerges from the switch by externally-applied magnetic fields. The switches of the present invention function for randomly polarized input light, producing similarly randomly polarized light at the appropriate output port. Specific embodiments relate to 1×2 and 1×4 switches in both single pass and dual pass embodiments. Single pass embodiments are switches in which light passes through the optical components in one direction emerging at the appropriate output port depending on the desired switching. Dual pass embodiments are switches in which the light makes a forward and reverse traverse of the switch with total reflection. Dual pass switches typically reduce crosstalk without increasing the size of the switch. Single pass embodiments using two Faraday rotators are also disclosed for reducing crosstalk.

2 Claims, 18 Drawing Sheets

FIG. 4
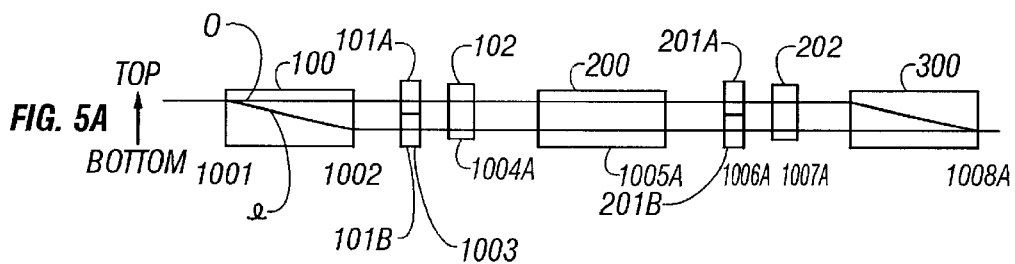
FIG. 5A
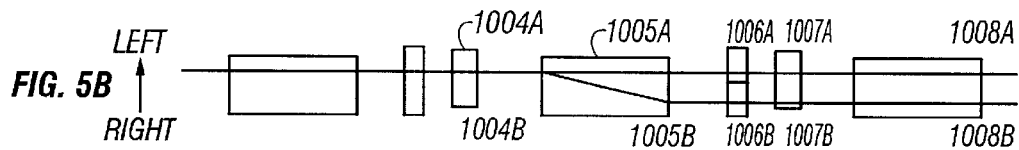
FIG. 5B

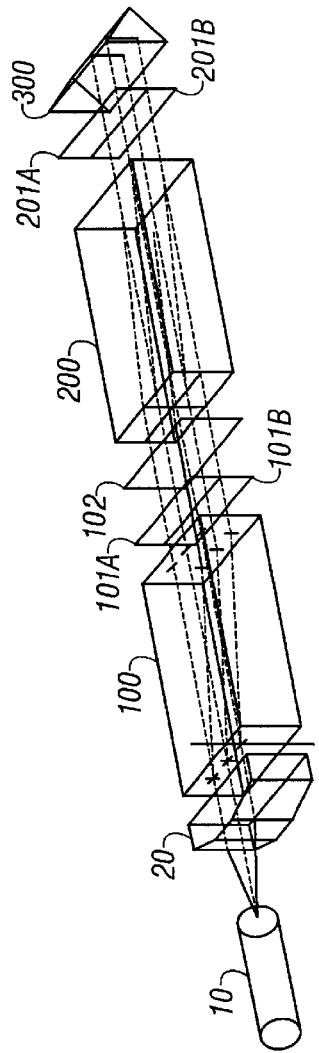
FIG. 9
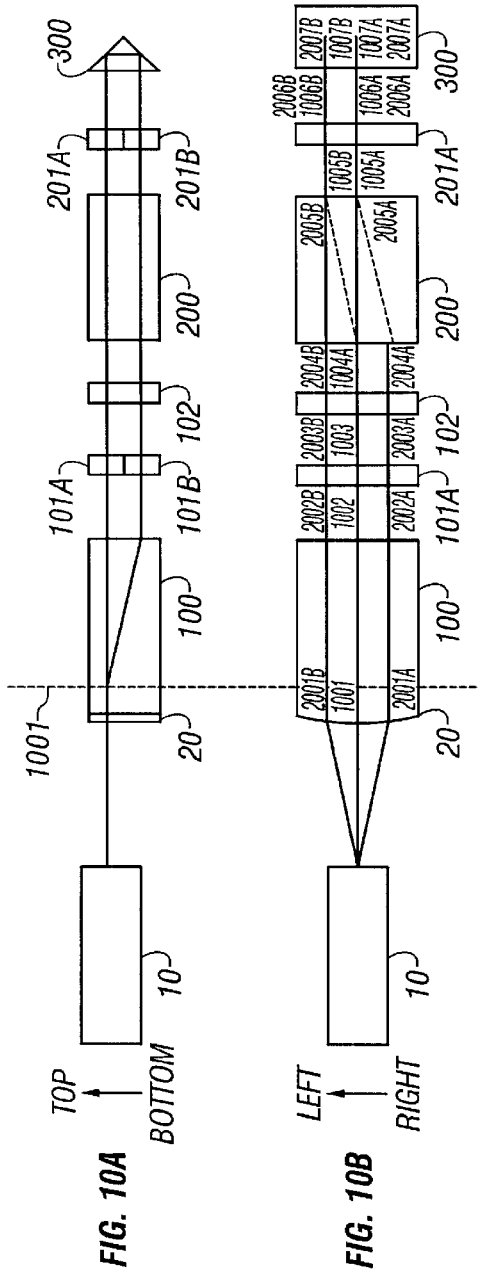
FIG. 10A
FIG. 10B

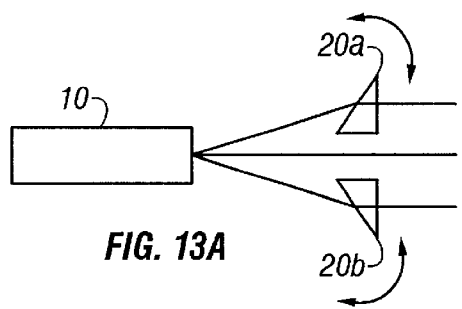 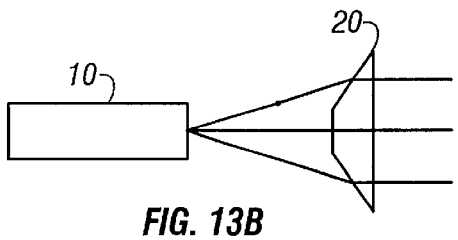
FIG. 13A  FIG. 13B
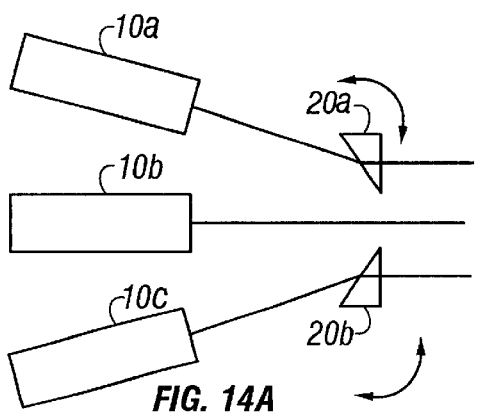 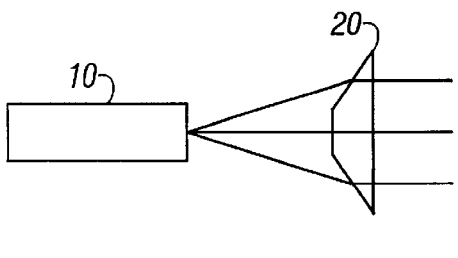
FIG. 14A  FIG. 14B
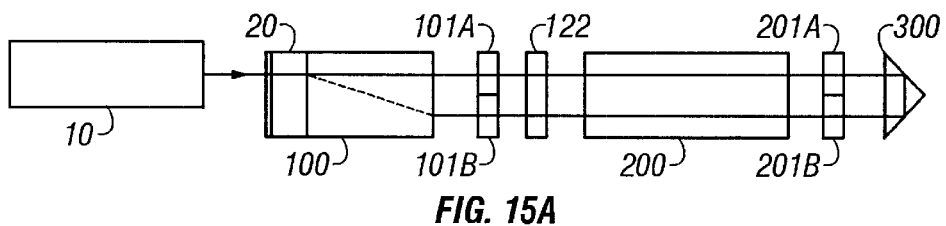
FIG. 15A
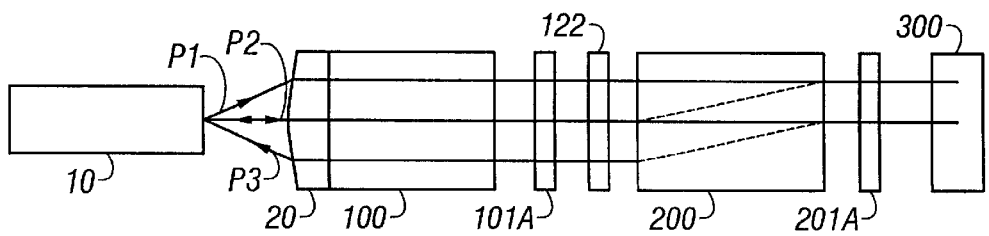
FIG. 15B

FOUR 1X2 SWITCHES •
COMBINED INTO A 1X5
SWITCH

M, 1XN SWITCHES GIVING
MXN SWITCH

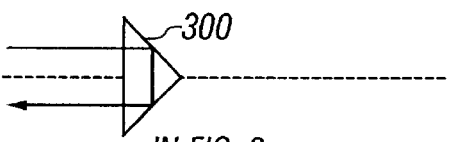
FIG. 31A IN FIG. 9
ALTERNATIVE ELEMENT TO 300 IN FIG. 9    (1) LENS + REFLECTION MIRROR
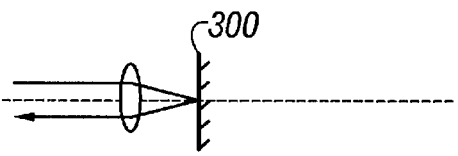
FIG. 31B
ALTERNATIVE ELEMENT TO 300 IN FIG. 9    (2) TWO MIRRORS
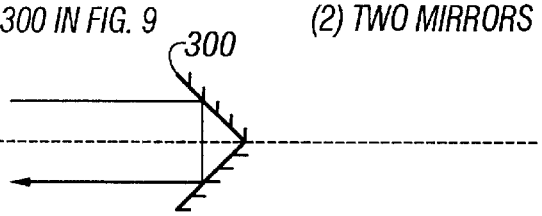
FIG. 31C
ALTERNATIVE ELEMENT TO 300 IN FIG. 9    (3) MIRROR + TWO PRISM
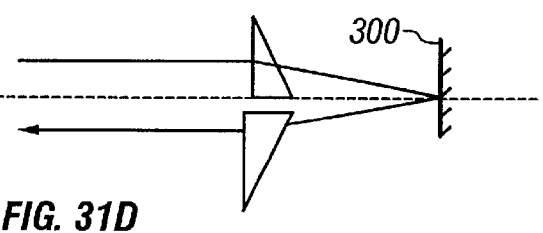
FIG. 31D
ALTERNATIVE ELEMENT TO 300 IN FIG. 9    (3) MIRROR + ONE PRISM
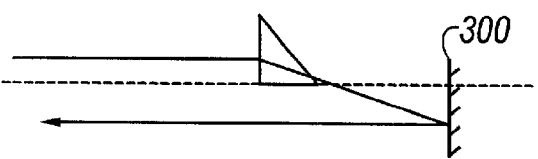
FIG. 31E

OPTICAL SWITCH

BACKGROUND

1. Technical Field

The present invention relates to optical switches and, more particularly, to optical switches based upon rotation of the plane of polarization of components of the incident light and, most particularly, to switches based upon magneto-optical effects.

2. Description of Related Art

One of the key components in optical communication networks is the optical switch which controls the direction of one or more incoming optical signals among several output ports under the control of one or more control signals. An example is the "1×2" switch in which light entering the 1×2 switch via an input port (port 1), is caused to exit from the switch via either of two output ports, port 2 or port 3, under the control of an external control signal, typically an electrical control signal. Traditionally, optical switches are used for network protection and for multiplexing two light beams into a single beam ("add/drop"). With the advent of all-optical networks (that is, without interconversion between optical and electrical signals during transmission) optical switches are expected to play a more and more important role in communication networks. New applications based upon optical switching are continuously being introduced, including an all-optical cross-connect.

Optical switches are typically classified into categories. One category is mechanical-optical switches in which the mechanical motion of a micromirror or other component directs the light beam to one of many optical fibers or other output ports. While mechanical-optical switches have been used in network systems, the necessity for mechanical motion may limit the number of switching cycles, the switching speed as well as the size and the long-term reliability of the device.

Optical mirror switches have been proposed that make use of a "walk-off" device that causes a light beam to take an angular path with respect to a direct, "pass-through" beam causing the angular beam to walk-off laterally with respect to the pass-through beam. In a first state of this switch, the input and output ports are directly coupled in a pass-through state. In a second or "reflective state," the input and input ports are decoupled so that an input signal is directly reflected and returned thorough the same input port. That is, an optical signal directed into a first port would be reflected and returned through the same port. Possibly an optical signal input via a second input port is reflected and returned to the second port. This type of switch cannot be used in multiple port switches.

Another category of optical switch is thermal-optical in which an optical path change is effected by a change in the ambient temperature. While thermal-optical switches have also been used in optical network systems, some drawbacks occur. Due to the need for precise temperature control, continuous power consumption is required. Thermal inertia may also limit the range of switching possible as well as limit the switching speed.

Acousto-optical switching makes use of piezoelectric materials in which the refractive index changes by a useful amount when pressure in the form of an acoustic wave is applied to the material. While microsecond switching speeds are obtainable with acousto-optical switches, continuous RF is typically needed to maintain the switching status, limiting the usefulness of such switches.

Electro-optical switches make use of the electro-optical effect in some materials in which the index of refraction changes under the influence of an applied electrical field. Such materials include lithium niobate, electro-optical ceramics, polymers and other nonlinear optical and semiconductor materials. Fast switching times can be obtained with electro-optical switches, on the order of nanoseconds ($10^{-9}$ sec.) for the case of lithium niobate. However, it is difficult to implement an electro-optical switch that has low insertion losses of light and whose performance is independent of the polarization of the input light. The high cost of typical electro-optical switches has hindered their wide application in networks.

Another type of proposed switch is the optical add/drop wavelength switch. This switch can change from a bridge state (in which output is identical to input) to an add/drop state. Polarization controllers and discriminators are used to selectively align or combine the add signal. This is typically a switch having two input ports and two output ports in which the light beam passes once through each polarization device within the switch. Thus, the crosstalk of the switch is basically determined by the contrast ratio of the polarization controllers used (i. e. the intensity ratio between on and off states), rendering it difficult to achieve very high isolation. Switches of this type typically achieve isolation less than about −50 dB.

The present invention relates to optical switches making use of rotation of the plane of the light's polarization, particularly by means of the magneto-optical effect in which application of a magnetic field to a magneto-optical material (a Faraday rotator) leads to switching. Particular embodiments of 1×2, 1×4, three-port optical circulator and optical add/drop switches are described. Some embodiments employ a dual forward and reverse traversal of the switch to accomplish the switching function. Such dual traverse optical switches reduce crosstalk without increasing the size of the switch.

SUMMARY

The present invention relates to optical switches and particularly to magneto-optical switches controlling the direction or port by which light emerges from the switch by externally-applied magnetic fields, in particular, Faraday rotation. The input light need not have any particular state of polarization, the switches of the present invention function for randomly polarized input light, producing similarly randomly polarized light at the appropriate output port. Specific embodiments relate to 1×2 and 1×4 switches in both single pass and dual pass embodiments. Single pass embodiments are switches in which light passes through the optical components in one direction emerging at the appropriate output port depending on the desired switching. Dual pass embodiments are switches in which the light makes a forward and reverse traverse of the switch with total reflection. Dual pass switches typically reduce crosstalk without increasing the size of the switch.

In the operation of a typical 1×2 switch, a beam of randomly polarized input light is split into 2 beams having orthogonal polarizations by the action of a first birefringent crystal functioning as a beam separator, causing the extraordinary beam to leave the first birefringent crystal displaced by a walk-off distance, L from the ordinary beam. The beams then pass through half-wave plates having configurations so as to rotate the plane of polarization by 45° in opposite directions. Both beams now pass through a Faraday rotator having a configuration and magnitude of applied magnetic field such that light passing through the rotator has its plane of polarization rotated by 45° in either clockwise or counterclockwise (positive or negative) directions as determined by the orientation of the applied magnetic field. Passage through another set of half-wave plates and a second birefringent crystal of appropriate configurations leads to the light beams being recombined at one of two output ports, determined by the sense (positive or negative) of Faraday rotation. A 1×4 switch is made by a combination and generalization of the techniques used in the 1×2 switch. Further sequential uses of Faraday rotators pursuant to the present invention produce a 1×N switch where $N=2^k$, and k=the number of Faraday rotators.

Other embodiments of the 1×2 magneto-optical switch employ two Faraday rotators configured so as to provide reduced crosstalk (typically less than approximately −40 dB), in a single pass switch which is beneficial for applications in optical network systems. Generalizations of the magneto-optical switches described herein yield a 2×2 optical add-drop switch. A dual Faraday rotator magneto-optical switch having two input beams and sufficient width to accommodate three output beams is configured having as input ports "in" and "add" and three output ports, "dump," "out," and "drop." The nature of the switch is to guide one of the two inputs to the active output port under control of the external control signals applied to two Faraday rotators.

Other embodiments of a 1×2 magneto-optical switch make use of a total reflector, such that the input port and both output ports are on the same side of the switch with the light beams traversing the switch twice, once in forward and once in reverse direction. This configuration of components helps to reduce the overall size of the switch.

Embodiments of the 1×2 optical switch can be converted to a three port optical circulator by, among other modifications, using a Faraday rotator causing a fixed polarization rotation rather than a variable rotator under the control of an external control signal.

Other embodiments of the present invention include: 1) A 2×2 add-drop switch including a reflective element. 2) A magneto-optical switch with a prism. 3) Additional embodiments of 1×4 magneto-optical switches.

BRIEF DESCRIPTION OF THE DRAWINGS

The drawings herein are not to scale.

FIG. 4: Position-polarization diagram of the location and polarization of light beams at various planes within the switch of FIG. 3.

FIG. 5: Schematic side view (A) and top view (B) of 1×2 dual rotator magneto-optical switch.

FIG. 9: Schematic perspective view of reflective 1×2 optical switch.

FIG. 10: Schematic side view (A) and top view (B) of 1×2 reflective optical switch of FIG. 9.

FIG. 13: Schematic side view of portion of reflective optical switches depicting independently adjustable prisms for guiding input and output light beams.

FIG. 14: Schematic side view of portion of reflective optical switches depicting independently adjustable prisms for guiding input and output light beams.

FIG. 15: Schematic side view and top view depictions of three port optical circulator.

FIG. 31: Additional embodiments of total reflector.

DETAILED DESCRIPTION

An optical switch is generically described as a device that controls the output of one or more incoming optical signals among one or more output ports. For example a "1×2" switch controls light coming into the switch at a single port, port 1, to exit from the switch at either of two exit ports, port 2 or port 3. An external control signal determines whether light arriving at port 1 exits via port 2 or port 3. More generally, an "M×N" switch directs light entering the switch by means of one or more ports 1, 2, . . . M to exit the switch by one or more exit ports, port M+1, M+2, . . . M+N, under the control of one or more externally-applied control signals. Optical switches pursuant to the present invention have several embodiments with differing optical characteristics, materials requirements and other properties such that different embodiments may be preferred for different applications.

Figure 29:
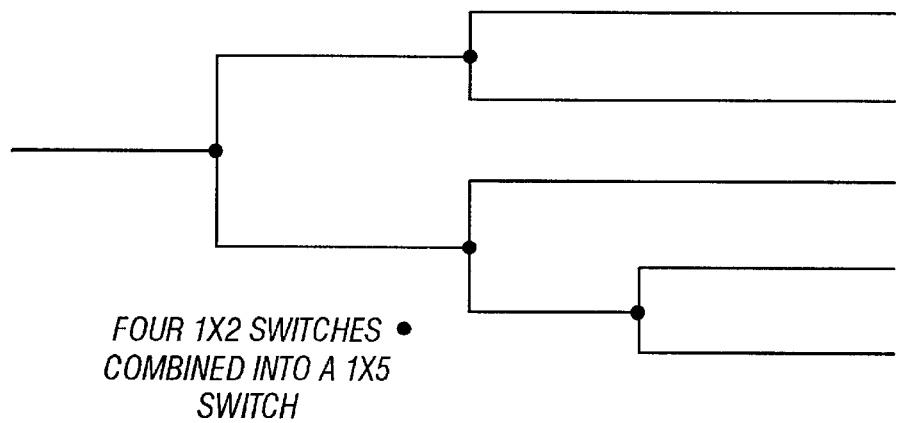
FIG. 29: An illustrative example of a combination of four 1×2 switches yielding a 1×5 switch.
Figure 30:
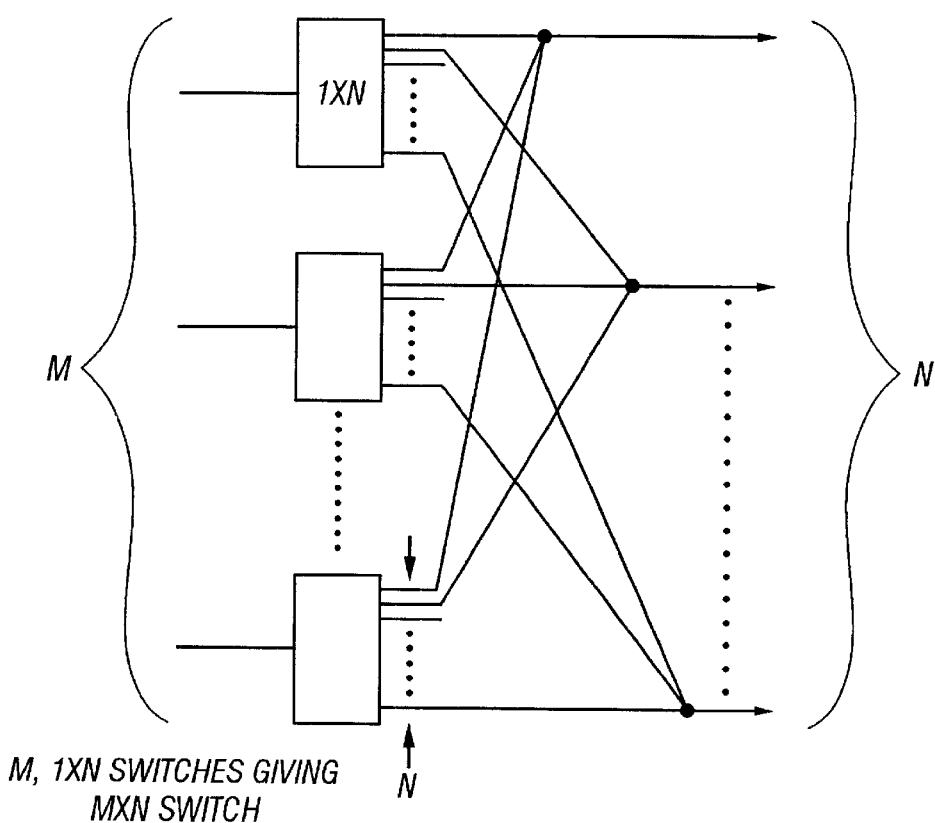
FIG. 30: An illustrative example of a combination of M, 1×N switches to give an M×N switch.

In principle, switches of arbitrary complexity can be constructed as combinations of simpler switches. FIG. 29 depicts one illustrative example of four 1×2 switches combined to yield a 1×5 switch. In general, any 1×N switch can be constructed from a plurality of 1×2 switches in a manner completely analogous to FIG. 29. FIG. 30 depicts one scheme for constructing an M×N switch from M, 1×N switches. Many other combinations of simpler switches to yield more complex switches can be designed by persons of ordinary skills in the art. In practice, loss of light intensity and other effects may limit the number of switches that can be combined, but arbitrary complexity can be built up in principle from simpler switches.

Magneto-Optical Switch

Some embodiments of the present invention relate to magneto-optical switches. That is, these embodiments control the direction or port by which light emerges from the switch (i.e. the switching) by employing materials whose optical properties change under the influence of externally-applied magnetic fields (i.e. magneto-optical materials). One particular magneto-optical effect is Faraday rotation in which the plane of polarization of incoming light is rotated through a certain angle as the light passes through the magneto-optical material in the presence of magnetic field. The rotatory power, $\rho$, denotes the angle through which the plane of polarization is rotated per unit length traversed by the light through the magneto-optical material. Typically, $\rho$ is approximately proportional to the magnetic field intensity in the direction of propagation of the light through the magneto-optical material given by Eq. 1.

$$\rho = V \cdot H_\parallel \quad \text{Eq. 1}$$

in which V is the Verdet constant and $H_\parallel$ is the component of the magnetic field along the direction of light propagation. The sense of rotation is governed by the direction of the magnetic field and the sign of V. For V>0, the rotation of the plane of polarization is in the sense of a right-handed screw pointing in the direction of the magnetic field. It follows that when light passes through a Faraday rotator, reflects back upon itself and traverses the rotator once more in the opposite direction, the plane of polarization undergoes twice the angular rotation as a single pass. That is, a single pass through a Faraday rotator of length L results in a rotation of $$\Theta = \rho \cdot L \quad \text{Eq. 2.}$$

and a second traverse following reflection yields an overall rotation of $$\Theta(\text{reflection}) = 2\Theta \quad \text{Eq. 3}$$

To be concrete in our discussion, we describe the particular embodiments related to 1×2 and 1×4 switches, not intending thereby to limit the present invention solely to such switches, as the concepts described herein may readily be applied by those having ordinary skills in the art to other forms of optical switches.

Figure 1:
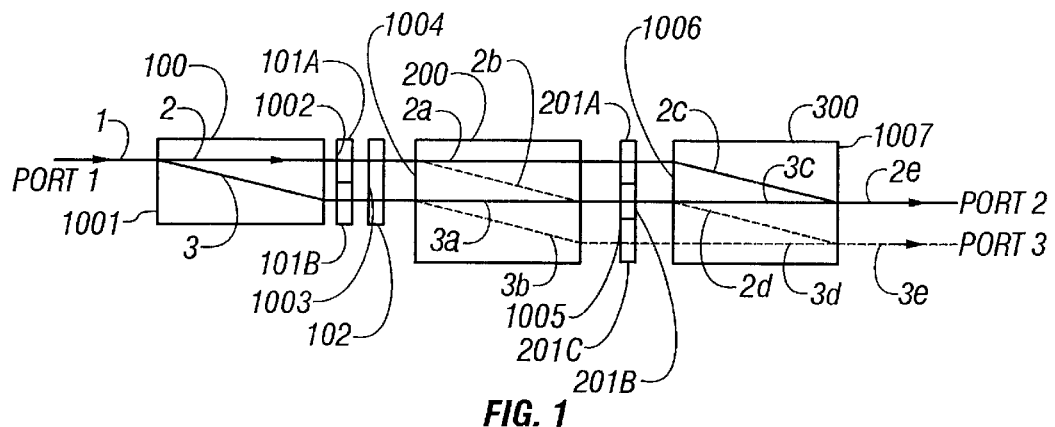
FIG. 1: Schematic side view depiction of 1×2 magneto-optical switch.

FIG. 1 depicts a 1×2 switch consisting of three birefringent crystals, 100, 200 and 300. Birefringent crystals include $YVO_4$, $TiO_2$, $LiNbO_3$, among others. Although $YVO_4$ is the material typically used in constructing the switches of the present invention, other birefringent crystals are included within the scope of the present invention.

The 1×2 switch depicted in FIG. 1 also contains 5 half-wave plates (polarization rotators) 101A, 101B, 201A, 201B, 201C and one Faraday rotator, 102. The devices herein typically make use of single crystal garnet for the Faraday rotator. Other materials may be used for Faraday rotators including the glasses yttrium-iron-garnet, terbium-gallium-garnet, terbium-aluminum-garnet, among others. The switch operates by means of a magnetic field applied to Faraday rotator, 102, causing either clockwise (positive) rotation or counterclockwise (negative) rotation in the plane of polarized light incident on the rotator, 102. By optical means described herein, the two states of rotator 102 (clockwise, counterclockwise) lead to a spatial separation of the light emerging from the device, that is, a 1×2 switching operation determined by the applied magnetic field.

A beam of randomly polarized light, 1, incident at port 1 is split into 2 beams having orthogonal polarizations by the action of birefringent crystal, 100. The ordinary beam (or "o-beam"), 2, travels in the direction of the incident beam. The extraordinary beam (or "e-beam"), 3, traverses crystal 100 at an angle from the o-beam. The direction of e-beam travel is given by a "walk-off angle" with respect to the direction of the o-beam, as depicted in FIG. 1. The "incident plane" is defined as the plane determined by the incident light ray and the optical axis of crystal 100. The polarization of the o-beam is thus perpendicular to the incident plane and the polarization of the e-beam is parallel to the incident plane.

Figure 2:
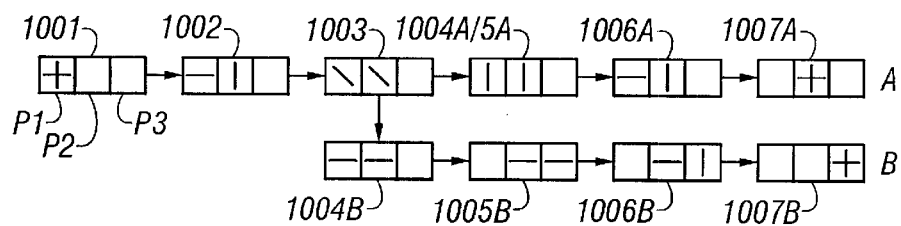
FIG. 2: Position-polarization diagram of the location and polarization of light beams at various planes within the switch of FIG. 1.

FIG. 2 depicts the polarization and position of the beam (or beams) at various locations in the switch depicted in FIG. 1. The blocks, $P_1$, $P_2$, $P_3$, of FIG. 2 substantially correspond to the vertical locations of Ports 1, 2, and 3 depicted in FIG. 1 where it is understood that the lines denoting Ports 1, 2 and 3 in FIG. 1 are extended throughout the structure, defining thereby vertical positions throughout the switch of FIG. 1. For example, block 1001 in FIG. 2 corresponds to an end-on view of the end face, 1001, of birefringent crystal, 100, as viewed along the direction of the light beam, left to right in FIG. 1. The "+" in the $P_1$ block denotes randomly polarized light incident on face 1001 at the location of Port 1, as depicted in FIG. 1. The absence of entries in blocks $P_2$ and $P_3$ indicate the absence of light at these locations on face 1001 of FIG. 1.

The action of birefringent crystal, 100 results in two orthogonaly polarized beams of light, 2 and 3, emerging from crystal 100 separated by a "walk-off" distance and emerging from crystal 100 at distinct vertical locations, $P_1$ and $P_2$ of face 1002 as depicted in FIG. 1 and FIG. 2. Beams 2 and 3 pass through half-wave plates 101A and 101B respectively. Half-wave plates, 101A and 101B have configurations so as to rotate the plane of polarization by 45° in opposite directions. Thus, at location 1003, $P_1$ and P2 have identical polarizations, as depicted in block 1003 of FIG. 2.

Both beams 2 and 3 now pass through Faraday rotator, 102. Rotator 102 has a configuration and magnitude of applied magnetic field such that light passing through the rotator has its plane of polarization rotated by 45° in either clockwise or counterclockwise (positive or negative) directions as determined by the orientation of the applied magnetic field. Thus, the application of a magnetic field to rotator 102 leads to one of two results. A counterclockwise rotation yields the horizontal polarizations depicted in 1004B while a clockwise rotation gives the vertical polarizations depicted in 1004A/1005A. The birefringent crystals employed in the present 1×2 switch are configured such that the vertical polarization direction corresponds to the ordinary beam polarization direction of the birefringent crystals 200. Thus, when passing through birefringent crystal 200, there is no deflection of the vertically polarized beams. These beams pass directly through crystal 200 as beams 2a and 3a, giving the polarizations depicted in FIG. 2 as 1005A. The horizontal polarization direction corresponds to the extraordinary beam polarization direction, displacing these beams during their traverse across crystal 200. The extraordinary beams, 2b and 3b, emerge from crystal 200 along directions $P_2$ and $P_3$ respectively. The location/polarizations of beams 2b and 3b at surface 1005 are depicted in 1005B of FIG. 2.

The beams 2a and 3a emerge from crystal 200 and pass through half-wave plates 201A and 201B respectively. (The half-wave plates, 201A, B and C of FIG. 1 are arranged from top to bottom as 201A, 201B, 201C respectively.) 201A and 201B are arranged to produce rotations of 90° and 0° respectively. A half-wave plate with 0° rotation, 201B, is not an optical element at all and could be omitted completely. However, it is convenient to include it along with 201A and 201C as a connector and means to provide structural support to 201A and 201B. Hereinafter we describe half-wave plates causing 0° rotation on an equivalent basis as other half-wave plates, understanding thereby that such an element is present chiefly for structural and/or mechanical reasons and plays no optical role in the functioning of the switch.

Passage through these half-wave plates results in beams 2a and 3a having the locations and polarizations at plane 1006 as depicted in FIG. 2, 1006A. The length and orientation of birefringent crystal 300 is chosen such that beams 2c and 3c combine in birefringent crystal 300 and both emerge at emerge at Port 2 as randomly polarized beam 2e, depicted in 1007A of FIG. 2. This simultaneously insures that beams 2d and 3d combine in crystal 300 to emerge at the location of Port 3, recombined into a randomly polarized beam.

If the Faraday rotator, 102, is set to have counterclockwise rotation of 45° by reversing the direction of the magnetic field applied to 102 (the magnetic field is not depicted in FIG. 1), a horizontal polarization corresponding to the extraordinary beam polarization direction for birefringent crystal, 200, is generated. These beams, 2b and 3b pass through crystal 200 and experience a lateral walk-off when passing through crystal 200, resulting in the beam position and polarizations depicted in FIG. 2, 1005B. These horizontally polarized beams then impinge upon half-wave plates, 201B and 201C. Half-wave plate 201B is configured so as to generate a polarization rotation of 0° (as described above in connection with the propagation of ordinary beam, 3A), while 201C is configured so as to generate a rotation of 90°. The locations and polarizations of beams 2b and 3b at the location of plane 1006 is given in FIG. 2 as 1006B. Thus, a beam of light incident at Port 1 is directed to either Port 2 or Port 3 under the control of a magnetic field applied to Faraday rotator, 102; a 1×2 switch.

A 1×4 switch can be made by a combination and generalization of the techniques used in the 1×2 switch. Briefly stated, a light beam incident on a 1×4 switch at Port 1 is split into two beams and deflected to either Port 2' or Port 3' by a Faraday rotator (among other optical components) under the control of an externally-applied magnetic field, as substantially described above in connection with the 1×2 switch. Each of these two beams (Port 2' and Port 3') are again split into two, and deflected by the application of a magnetic field to a Faraday rotator (along with other components) into one of four output ports, Ports 2, 3, 4, 5 respectively, creating thereby a 1×4 optical switch.

Figure 3:
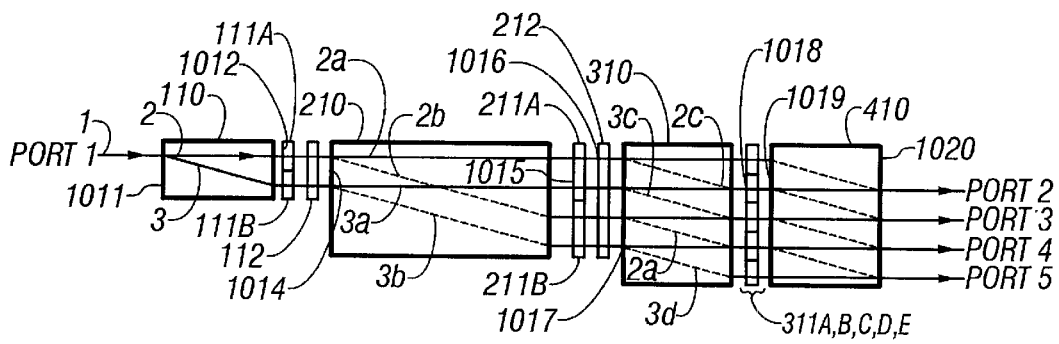
FIG. 3: Schematic side view of 1×4 magneto-optical switch.

We refer to FIGS. 3 and 4 to describe the 1×4 switch in detail. As in the case of the 1×2 switch, beam 1 is incident on birefringent crystal, 110, at Port 1 ("$P_1$") and is split into orthogonaly polarized beams 2 and 3, emerging with the position-polarizations depicted in FIG. 4, 1012. Passing through half-wave plates 111A and 111B rotates the planes of polarization as depicted in 1013. Passing through Faraday rotator 112 and birefringent crystal, 200, displaces the extraordinary beams by a walk-off distance. The 1×2 switch depicted in FIG. 1 configures birefringent crystal 210 such that beams 2b and 3a emerge at the same spatial location, In contrast, the birefringent crystal, 210, in FIG. 3 is configured so the four beams 2a, 3a, 2b, 3b emerge from crystal 210 at four distinct spatial locations, Ports 1, 2, 3, 4. Thus, beams 2a, 3a, 2b and 3b emerge from crystal face 1015 at port locations $P_1$, $P_2$, $P_3$, $P_4$ respectively. The position-polarization diagrams for these four beams as they traverse the optical switch from face 1011 to face 1015 is given in FIG. 4, rows 1011–1015 and columns A–D. At this location in the 1×4 switch (1015), the polarizations depicted in columns A and B are identical as are the polarizations depicted in columns C and D. As only one binary choice has been made by Faraday rotator 112, only two distinct states of the system occur as (A,B) and (C,D) in FIG. 4.

Beams 2a and 3a pass through half-wave plate 211A, rotating the polarizations by +45°, depicted in FIG. 4, row 1016, columns A and B respectively. Half-wave plate 211B rotates the polarization of beams 2b and 3b in the opposite (negative) sense, depicted in FIG. 4, row 1016, columns C and D. The second binary choice is made at Faraday rotator 212, rotating the planes of polarization by 45° in either clockwise or counterclockwise directions as determined by the magnetic field applied to the Faraday rotator. Thus, FIG. 4, row 1017, columns A and B take on distinct polarizations as depicted, as do columns C and D.

Depending on the polarization state of Faraday rotator 212, beam 2a and 3a either pass straight through birefringent crystal 310 or walk off to beams 2c and 3c. Similarly 2b and 3b either go straight or become 2d and 3d. The polarizations at face 1017 are depicted in FIG. 4, row 1017, columns A–D. Half-wave plates 311A–311E (from top to bottom, A–E respectively) rotate the polarizations depicted in row 1018 to result in the polarizations depicted in row 1019. Birefringent crystal 410 recombines the pair-wise beams as depicted in FIG. 4. The result is one of the four output beams depicted in FIG. 4, row 1020, under the control of two independent control signals (magnetic fields) applied to Faraday rotators 112 and 212; that is a 1×4 switch.

The techniques described above can be generalized by the addition of Faraday rotators to produce a 1×N switch where $N=2^k$, and k=the number of Faraday rotators. Practical considerations related to the size of the necessary crystals, total insertion loss, intensity of light and the like, may limit N in practice. But generalization of the basic switch structure to 1×N switches is included within the scope of the present invention.

Low-Crosstalk Magneto-Optical Switch: Dual Rotator 1×2 Switch

Other embodiments of the 1×2 magneto-optical switch employ two Faraday rotators (typically garnet, although other materials are included within the scope of the present invention). These embodiments provide reduced crosstalk (typically less than approximately −40 dB), which is beneficial for applications in optical network systems.

FIG. 5 depicts a typical configuration for dual rotator 1×2 switches in side view 5A and top view 5B. Top-bottom, left-right orientations are depicted by the arrows. The functioning of the device is best explained by FIG. 5 and the position-polarization diagram for the light at various locations within the switch depicted in FIG. 6.

A beam of randomly polarized light is incident on the upper left quadrant of face 1001, port $P_1$. Birefringent crystal 100 separates the beam into ordinary ("o") and extraordinary ("e") components, appearing at face 1002 in quadrants $P_1$ and $P_2$ respectively. For purposes of illustration, and not by way of limitation, the ordinary beam is presumed to be horizontally polarized as depicted at 1002 in FIG. 6. Different orientations of the optical components do not change the essential operating characteristics of the device.

The ordinary beam passes through crystal 100 undeflected, passing through half-wave plate 101A. Plate 101A has a structure and orientation so as to rotate the plane of polarization of the ordinary beam by 45° counterclockwise ("ccw") when viewed from the orientation of FIG. 6 (that is, looking along the direction of travel of the light, looking from left to right in FIG. 5). The extraordinary beam emerges from crystal 100 separated from the ordinary beam by a walk-off distance such that the extraordinary beam passes through half-wave plate, 101B. Plate 101B is chosen so as to rotate the plane of polarization of the extraordinary beam by 45° clockwise ("cw"), opposite from the direction of rotation of the ordinary beam. The polarizations of the extraordinary beam and the ordinary beams are then parallel upon emerging from the half-wave plates, 101A and 101B (that is, at location 1003) as depicted as 1003 in FIG. 6.

Figure 6:
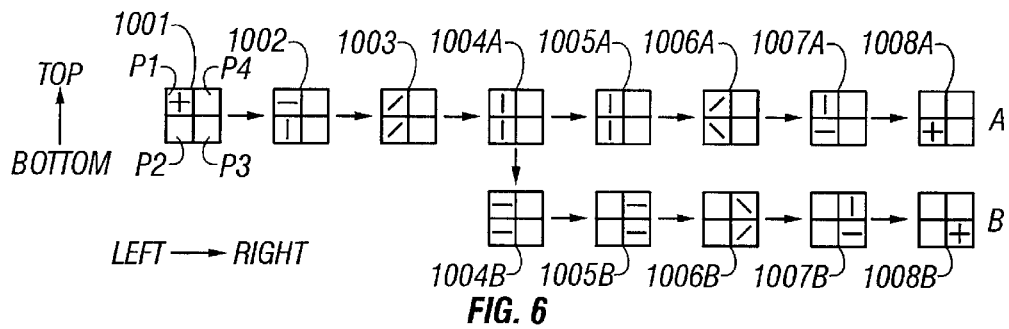
FIG. 6: Position-polarization diagram of the location and polarization of light beams at various planes within the switch of FIG. 5.

The beams then encounter Faraday rotator 102 that changes the orientations of the planes of polarization by 45°. The sense of rotation, cw or ccw, is determined by the orientation of the external magnetic field applied to the rotator and provides the mechanism by which the external control signal (magnetic field) controls the switching of light. The polarizations emerging from rotator 102 are depicted at plane 1004 for the two directions of applied magnetic field. 1004A relates to external magnetic field applied to rotator 102 so as to cause ccw rotation. Application of a reversed magnetic field causes cw rotation as depicted in FIG. 6, 1004B.

Birefringent crystal 200 is oriented (unlike 100) such that vertically polarized light in 1004A passes through birefringent crystal 200 undeflected as the optical axis of crystal 200 lies in the horizontal plane defined by the horizontal direction and the light propagation direction. As a result, two vertically polarized beams as in 1004A correspond to ordinary beams in crystal 200 while two horizontally polarized beams as in 1004B correspond to extraordinary beams in crystal 200 and walk off horizontally upon exiting crystal 200. The position-polarizations at plane 1005 are depicted in FIG. 6 1005A (1005B) for the passage through crystal 200 with polarization along the ordinary (extraordinary) optical axis respectively.

The beams next encounter half-wave plates 201A and 201B. Plate 201A intercepts beams in the upper ports, $P_1$ and $P_4$, while 201B intercepts beams in $P_2$ and $P_3$. Plate 201A has a structure and geometry so as to cause rotation of the plane of polarization by 45° in the cw direction. Plate 201B is configured to rotate the plane of polarization by 45° ccw. The position-polarizations at plane 1006 are depicted in FIG. 6, 1006A and 1006B respectively.

The beams now encounter a second rotator, 202, in which the magnetic field is applied in the same sense as for rotator 102. That is, both rotators cause the plane of polarization to rotate 45° in the cw (FIG. 6B) or ccw direction (FIG. 6A). The position-polarizations at plane 1007 are depicted in FIG. 6, 1007A (ccw rotation by 202), or 107B (cw rotation).

The beams then encounter birefringent crystal 300 oriented (like 100, unlike 200) such that horizontally polarized light passes through undeflected. Vertically polarized light passing through 300 experiences a walk-off. 300 has a configuration such that walk-off of vertically polarized light in port $P_1$ (or $P_4$) causes such light to emerge from crystal 300 recombined with the horizontal polarization, reconstituting the original beam incident in port $P_1$ in either ports $P_2$ or $P_3$ depending on the orientation of the magnetic fields applied to rotators 102 and 202; that is, a 1×2 switch.

2×2 Optical Add-Drop Switch

Figure 7A:
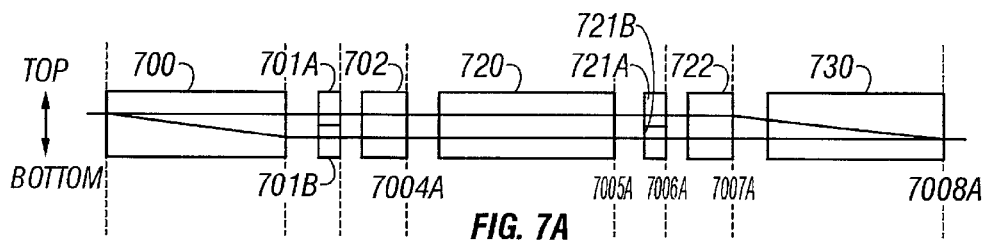
FIG. 7: Schematic side view (A) and top view (B) of 2×2 add-drop switch.
Figure 7B:
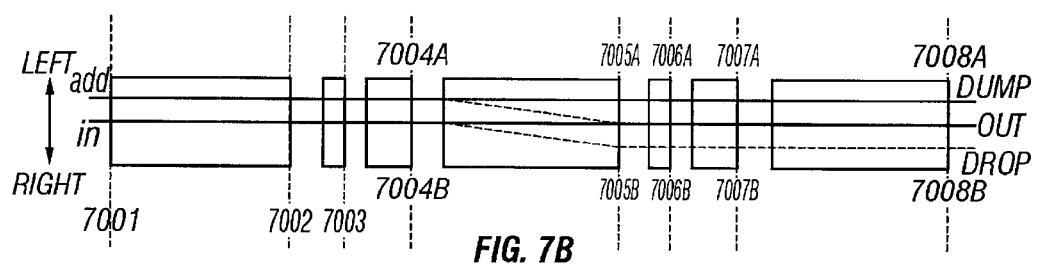

A 2×2 optical add-drop switch has light beams impinging on two input ports and a mechanism to direct one or the other of the input beams to the active output port while directing the unwanted beam to one or more beam dumps. The magneto-optical switch described above and in FIGS. 5 and 6 is easily generalized to provide such add-drop functionality. FIG. 7 depicts a dual rotator magneto-optical switch of the general form depicted in FIG. 5, but having sufficient width to accommodate three output beams. FIG. 7B is the top view of one example of such a switch including two input ports, "in" and "add" and three output ports, "dump," "out," and "drop." Designating the two input beams as input and add is conventional terminology in the field, but does not imply any inherent distinction in the input. The nature of the switch is to guide one of the two inputs to the active output port under control of the external control signals applied to two Faraday rotators. The designations of input and add ports is thus arbitrary.

Figure 8:
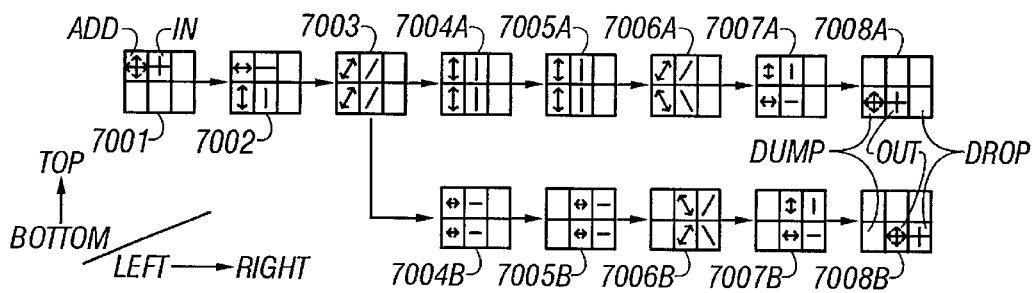
FIG. 8: Position-polarization diagram of the location and polarization of light beams at various planes within the switch of FIG. 7

The add-drop switch of FIG. 7 directs the "in" and/or "add" beams through birefringent crystal 700 splitting the beams into two polarizations. FIG. 8 depicts at 7001 a randomly polarized add and in beam each separating into orthogonaly polarizations, the extraordinary polarization displacing by a walk-off distance while the ordinary polarization proceeds undeflected through crystal 700. The position-polarization of the beams at plane 7002 is depicted in 7002 of FIG. 8. Half-wave plates, 701A and 701B rotate the planes of polarization by 45° in opposite directions, encountering the first Faraday rotator, 702, with the position-polarizations depicted in FIG. 8, 7003. The rotation depends upon the direction of the magnetic field applied to 702, resulting in the position-polarizations depicted in 7004A and 7004B respectively for the two opposite directions of applied magnetic field. Birefringent crystal 720 passes the (vertically polarized) ordinary beams unimpeded, but displaces the horizontally polarized to the positions depicted in 7005B. Half-wave plates 721 A and B, rotator 722 and birefringent crystal 730 recombine the beams in a manner similar to the 1×2 switch described above. The position-polarization diagrams following the half-wave plates, the rotator and the birefringent crystal are given in 7006A and B 7007A and B, 7008A and B respectively. The upper or A path directs the in beam to the out channel while directing the add beam to the dump. The lower, B path directs the in beam to the drop while directing the add beam to the out port. Thus, the sense of the magnetic field applied to rotators 702 and 722 determine whether the out port receives the in beam or the add beam, just as required for an optical add-drop switch.

The positions along the optical path of the Faraday rotators, 702 and 722, can be interchanged with the adjacent half half-wave plates (701A, 701B) and (721A, 721B) respectively without changing the essential mode of operation of the device.

Reflective 1×2 Optical Switch

FIG. 9 depicts in perspective view other embodiments of a 1×2 magneto-optical switch making use of a total reflector, 300, such that the input port and both output ports are on the same side of the switch. FIGS. 10A and 10B are side and top views respectively of the switch. FIG. 11 is a position-polarization depiction of light as it appears at various location during its processing by the reflective 1×2 switch.

The total reflector depicted in FIG. 9, FIG. 10 (and subsequent figures) is depicted as a right angle prism in order to be definite and not to limit the scope of the invention to these particular embodiments. In particular, the right angle prism of FIG. 9 can be replaced by a combination of a focusing lens and a reflection mirror. The focusing lens can be cylindrical, spherical or aspheric. The reflection mirror can be planar, concave or convex depending on the total combining focal length of the focusing lens plus reflection mirror. These embodiments are depicted in FIGS. 31A–31E and are given by way of illustration, not limitation and not intending to exclude other embodiments obvious to those having ordinary skills in the art.

Randomly polarized light is incident on the input port of the switch ($P_2$ in FIG. 11) from a source, 10. Source 10 is typically a three fiber collimator, although other sources of light are not excluded. The incident light is typically directed through a three step prism, 20 to facilitate directing the light from the from the input fiber of collimator, 10 into the switch, and directing the light from the switch to the proper output fiber of collimator 10.

Figure 11A:
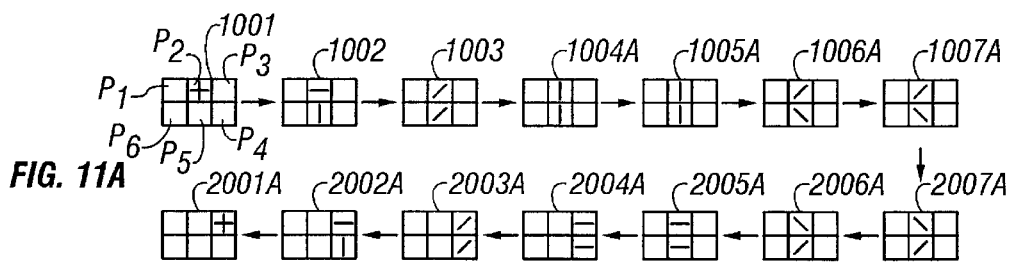
FIG. 11: Position-polarization diagram of the location and polarization of light beams at various planes within the switch of FIG. 9 and FIG. 10.
Figure 11B:
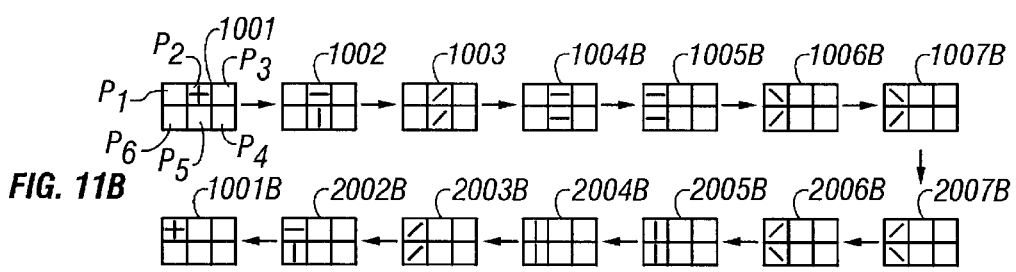

Light incident from collimator 10 as beam 1001 in port $P_2$ passes through birefringent crystal 100, separating the horizontally polarized ordinary beam from the vertically polarized extraordinary beam by a vertical walk-off distance. The position-polarization at location 1002 of the incident beams is given in block 1002 of FIG. 11. Passing through half-wave plates 101A and 101B rotates the planes of polarization 45° in the sense depicted in FIG. 11, 1003. Faraday rotator 102, under the influence of an applied magnetic field not depicted in the figures, rotates the plane of polarization by 45° in either the cw or ccw directions depending on the direction of the applied field. FIG. 11A depicts position-polarization for ccw rotation while FIG. 11B depicts cw rotation by 102. To be concrete in our description, we consider these two cases separately.

The ccw rotated beams at 1004A encounter birefringent crystal 200. Presuming the ordinary axis of crystal 200 is the vertical plane, the beams of 1004A traverse crystal 200 unchanged, as shown in 1005A. The beams encounter half-wave plates 201A and 201B configured to rotate the upper beam 45° cw and the lower beam 45° ccw, as depicted in 1006A. Total reflector, 300 is conveniently chosen to be a right-angle prism or other reflector that interchanges upper and lower beams as depicted in 2007A. Unchanged on their way to half-wave plates 201A and 201B (depicted in 2006A), the returning beams counter the half-wave plates and are rotated 45° ccw for the upper beam and cw for the lower beam. (traversing the half-wave plates in the opposite direction from the incoming beams 1005A–1006A). Passing again through crystal with extraordinary polarization leads to the displacement depicted in 2004A, from ports $P_2$ and $P_5$ to $P_3$ and $P_4$. Passing through Faraday rotator 102 rotates the plane of polarization of the beams 45° ccw, resulting in the positions-polarizations of 2004A. (It is well known that reverse passage through a Faraday rotator does not reverse the sense of rotation. See, for example, *Fundamentals of Photonics* by B. E. A. Saleh and M. C. Teich, John Wiley & Sons, 1991, pp. 225–227.) Passing the light beams through half-wave plates 101A and 101B produces the positions-polarizations depicted in 2003A. The birefringent crystal 100 displaces extraordinary beam in $P_4$ of 2002A into port $P_3$, emerging as output beam directed by prism 20 to the appropriate fiber of collimator 10.

If Faraday rotator 102 experiences an opposite field from that depicted in 1004A, the position-polarization diagrams in FIG. 11B result. Crystal 200 produces a walk-off of the horizontally polarized beams at 1004B to yield 1005B. The progression through half-wave plates (201A, 201B), reflector (300), half-wave plates (201A, 201B), crystal (200), Faraday rotator (102), half-wave plates (101A, 101B) and crystal (100) proceeds in direct analogy with the progression of the "A" beam; 1005B-1006B-1007B-2007B-2006B-2005B-2004B-2003B-2002B-1001B, directing light into port $P_1$ of the fiber collimator. Thus, a switch from port $P_1$ to either ports $P_2$ or $P_3$ is accomplished under control of the magnetic field applied to Faraday rotator 102.

Figure 12A:
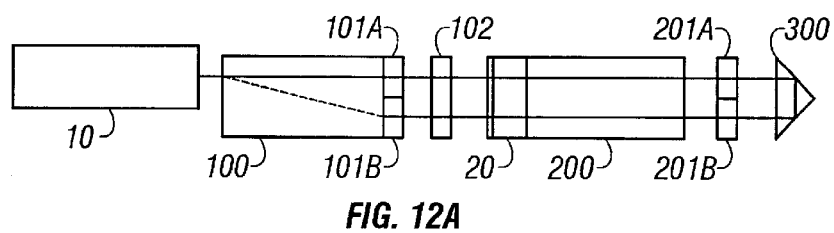
FIG. 12: Schematic side view (A) and top view (B) of 1×2 reflective optical switch with internal prism.
Figure 12B:
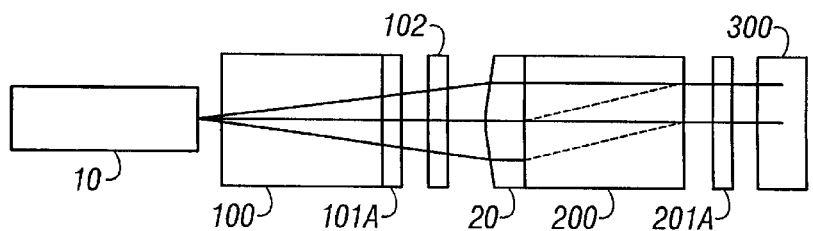

An alternative embodiment is depicted in FIG. 12 in which prism, 20, is located between crystals 200 and rotator 102. This configuration of components helps to reduce the overall size of the switch but functions in essentially the same manner as described above.

In all embodiments herein using three step prism 20 or equivalent, two prism wedges can replace the three step prism. This is depicted in FIG. 13 in which the three step prism (20 in FIG. 13B) is replaced by two prism wedges, 20a and 20b. Each prism wedge is typically adjustable independent of the other. This permits independent direction of returning beams in ports $P_1$ and $P_3$ by independent adjustment of prism 20a and/or prism 20b. Adjustment of fiber collimator 10 in cooperation with adjustment of prisms 20a and 20b permits input $P_2$ as well as outputs, $P_1$ and $P_3$ to be independently adjusted.

Figure 23:
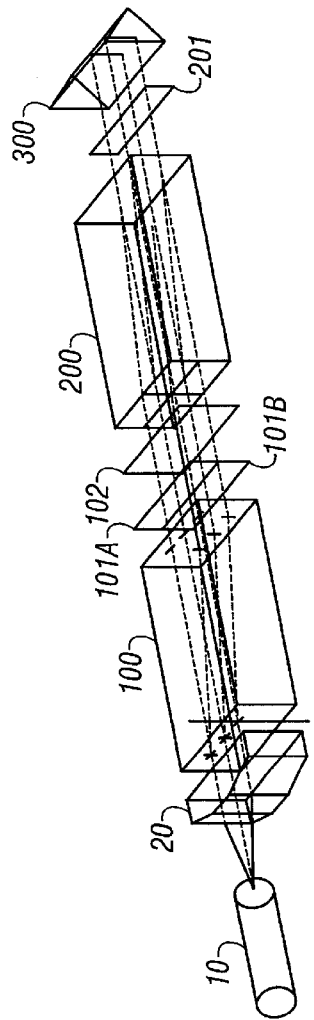
FIG. 23: Schematic perspective view of reflective 1×2 optical switch.
Figure 24A:
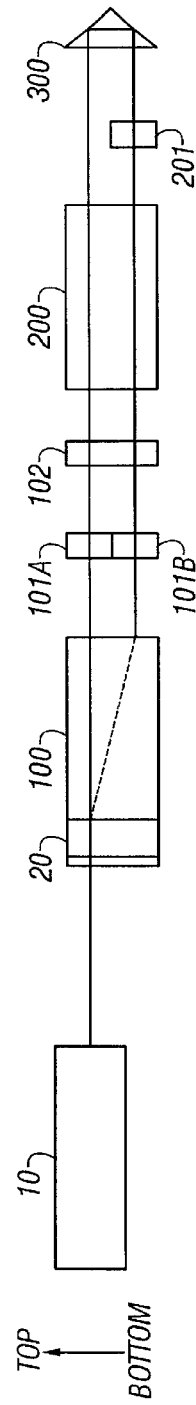
FIG. 24: Schematic side view (A) and top view (B) of 1×2 reflective optical switch of FIG. 23.
Figure 24B:
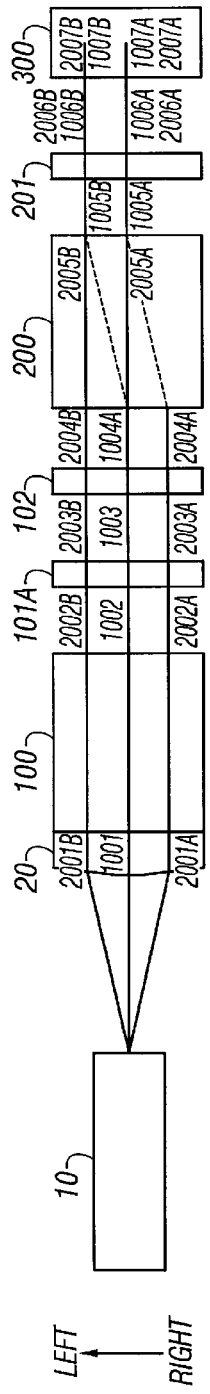
Figure 25A:
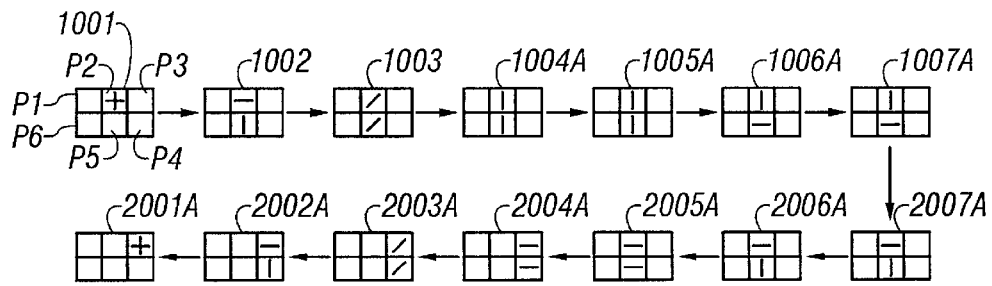
FIG. 25: Position-polarization diagram of the location and polarization of light beams at various planes within the switch of FIG. 23 and FIG. 24.
Figure 25B:
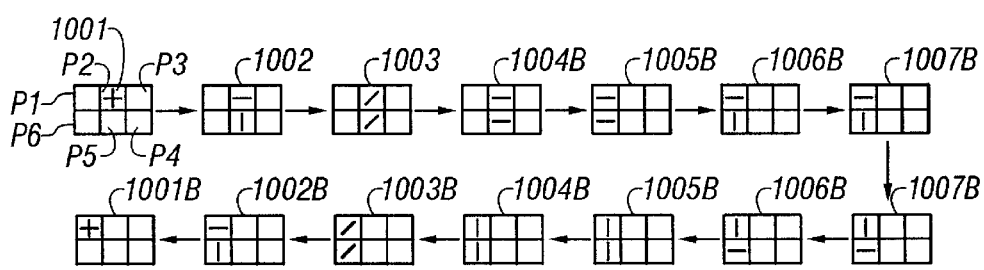

FIGS. 23 and 24 depict another embodiment of the switch depicted in FIGS. 9 and 10 in which the double half-wave plates 210A and 201B are replaced by a single half-wave plate 201 intersecting only the lower beam. The position-polarization diagram for the switch of FIGS. 23 and 24 is given in FIG. 25. Half-wave plate 201 has a configuration so as to rotate the plane of polarization by 90°. Thus, the upper beam is unchanged while the polarization of the lower beam is rotated by 90°, as depicted in FIG. 25 as light moves from 1005A(B) to 1006A(B) in its forward traverse of the switch, or from 2006A(B) to 2005A(B) in its return traverse.

Another embodiment applicable to all of the reflective switches is depicted in FIG. 14 in which separate prism wedges 20a and 20b are used. The separate prism wedges are arranged to direct light away from the center, allowing each output beam to be coupled to a single fiber collimator, 10a and 10c, with reduced losses.

Three Port Optical Circulator

Figure 16:
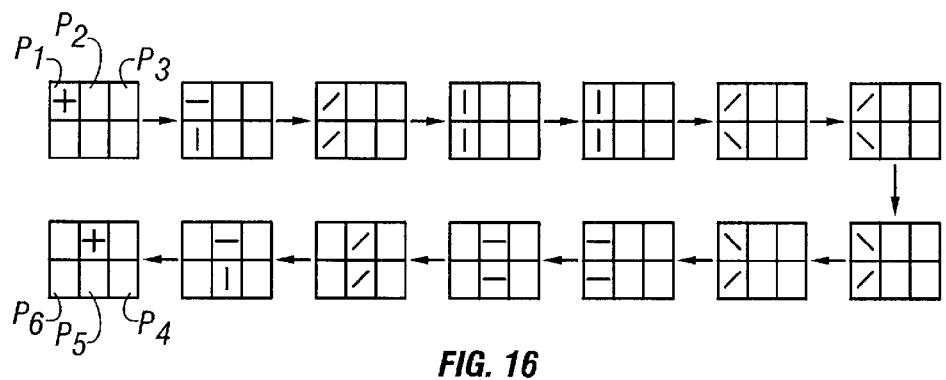
FIG. 16: Position-polarization diagram of the location and polarization of light beams at various planes within the switch of FIG. 15.

The 1×2 optical switch depicted in FIG. 10 can be converted to a three port optical circulator. FIG. 15 is essentially the 1×2 switch of FIG. 10 with the switching Farady rotator, 102 replaced by a fixed Faraday rotator, 122. If rotator 122 is fixed in the "A" configuration defined by FIG. 11, 1003 to 1004A, then light entering port $P_1$ exits via port $P_2$. The position-polarization diagrams for traverse through the circulator of FIG. 15 is depicted in FIG. 16.

Similarly, light entering port $P_2$ exits via port $P_3$ as demonstrated in the position-polarization diagrams of FIG. 11A.

2×2 Optical Add-Drop Switch with Reflective Element

Figure 17A:
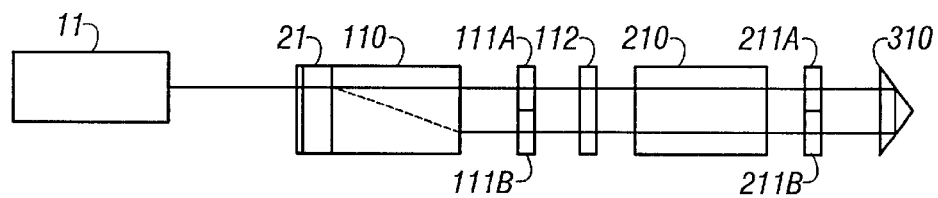
FIG. 17: Schematic side view (A) and top view (B) of reflective 2×2 add-drop switch.
Figure 17B:
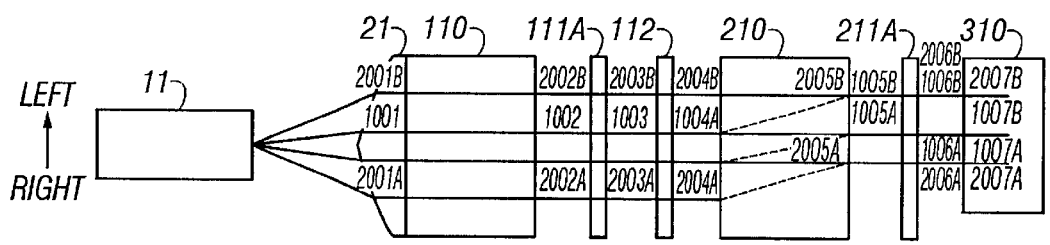

A 2×2 add-drop switch including a reflective element can be derived from the 1×2 optical switch depicted in FIG. 10. Referring to FIG. 17, 11 is a four-fiber collimator launching randomly polarized beams onto a four step prism, 21. Normal operation of the switch directs the input beam at port $P_3$ to output port $P_2$. The position-polarization diagrams for normal transmission are given in FIG. 18B. Unless otherwise noted, all references henceforth are to elements of FIG. 18B for those elements having the same numbers as FIG. 18A. Randomly polarized light incident at port $P_3$ is separated into vertical and horizontal polarizations by birefringent crystal 110 and the extraordinary beam (vertical polarization) is displaced vertically and emerges from 110 in port $P_6$, depicted at 1002. Half-wave plates 111A and 111b rotate the planes of polarizations by 45° in the sense depicted in 1003. Faraday rotator, 112, has an applied magnetic field such that 45° cw rotation is the result of passing through 112, as depicted in 1004B. Birefringent crystal 210 is arranged such that the horizontal axis is the extraordinary optical axis, causing the beams in ports $P_3$ and $P_5$ of 1004B to walk-off to ports $P_2$ and $P_7$ as depicted in 1005B. Passage through half-wave plates 211A and 211B causes rotation of the plane of polarization depicted in 1006B, impinging on the 90° reflector, 310, as 1007B. Reflector 310 interchanges top and bottom, returning the beams as depicted in 2007B, impacting the half-wave plates 211A and 211B as depicted in 2006B. The half-wave plates rotate the planes of polarization as depicted in 2005B, leading to passage through crystal 210 undisturbed as both beams are polarized along the ordinary axis. Emerging from crystal 210 as 2004B, rotator 112 causes the position-polarization depicted in. Half-wave plates produce the position-polarization of 2002b that are recombined by crystal 110 to 1001B. Thus, randomly polarized light incident at port $P_3$ exits at port $P_2$ when Faraday rotator 112 has a magnetic field applied so as to cause 45° cw rotation of the plane of polarization (1003→1004B and 2004B→2003B).

Figure 18A:
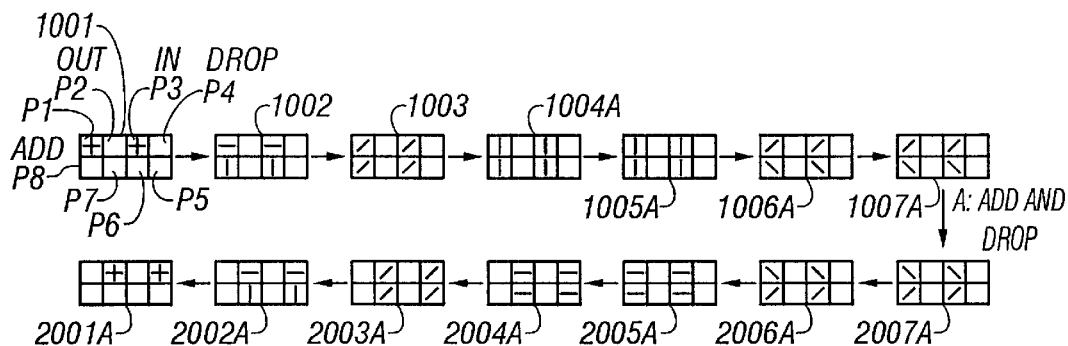
FIG. 18: Position-polarization diagram of the location and polarization of light beams at various planes within the switch of FIG. 17.
Figure 18B:
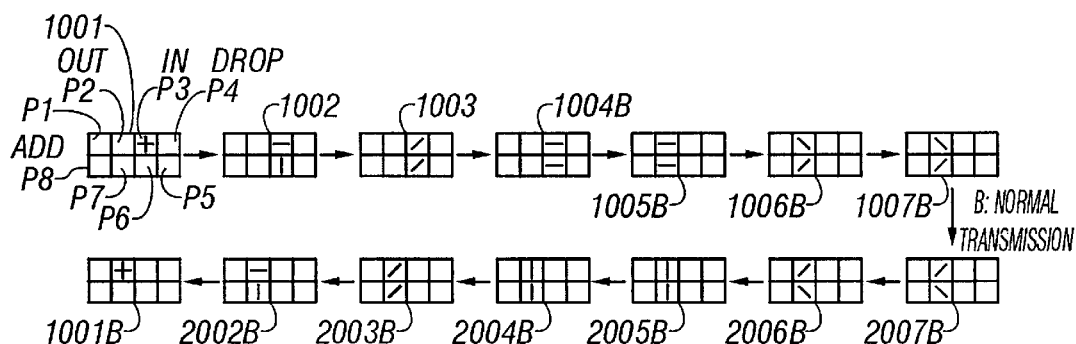

Reversing the effect of Faraday rotator 112 by applying a magnetic field so as to cause 45° ccw rotation of the plane of polarization results in the "add" functionality of the add-drop switch, depicted in FIG. 18A. Randomly polarized beams incident on ports $P_1$ and $P_3$ provides the position-polarization diagram 1001 of FIG. 18A. Passing through birefringent crystal 110 leads to the separation of vertical and horizontal polarizations and the walk-off of the extraordinary (vertical) polarization, 1002 (FIG. 18A). Half-wave plates, 111A and 111B rotate the polarization planes by 45° as depicted in 1003 of FIG. 18A. Faraday rotator 112 has an applied magnetic field so as to rotate the plane of incident polarization by 45° ccw, as depicted by 1004A. Birefringent crystal 210 is arranged so the vertical polarization is the ordinary optical axis of the crystal, leading to vertically polarized beams in $P_1$, $P_3$, $P_6$ and $P_8$ traversing crystal 210 undisturbed. Half-wave plates 211A and 211B rotate the planes of polarization as depicted in 1006A. The 90° reflector 310 interchanges top and bottom ports (2007A). Half-wave plates 211A and 211B rotate polarizations as depicted in 2005A, leading to undisturbed transmission by birefringent crystal 210 (2004A). Rotator 112 and half-wave plates 111A, 111B cause the position-polarization effects depicted in 2003A and 2002A respectively. Crystal 110 recombines upper and lower beams, resulting in output at ports $P_2$ and $P_4$.

Thus, we make the following associations to produce an add-drop optical switch.

add beam @ $P_1$ out beam @ $P_2$ inbeam @ $P_3$ drop beam @ $P_4$.

As described above, setting arranging Faraday rotator 112 for cw rotation (FIG. 18B) directs the in beam $P_3$ to the out port $P_2$. Arranging the rotator 112 for ccw rotation (FIG. 18A) directs the in beam $P_3$ to the drop port $P_4$ and the add beam $P_1$ to the out port $P_2$.

Magneto-Optical Switch with Prism

Figure 19A:
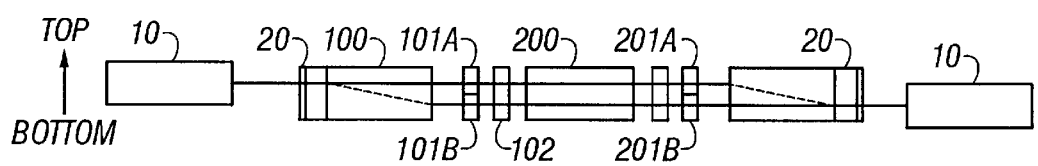
FIG. 19: Schematic side view (A) and top view (B) of 2×2 magneto-optical switch with prisms.
Figure 19B:
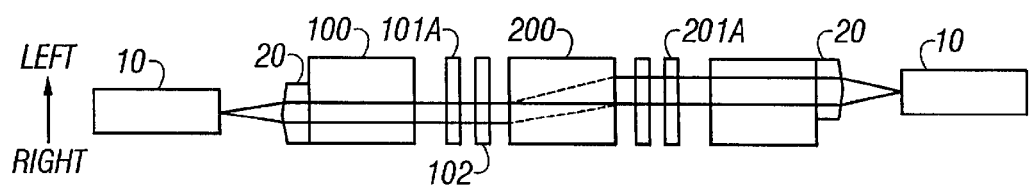
Figure 20A:
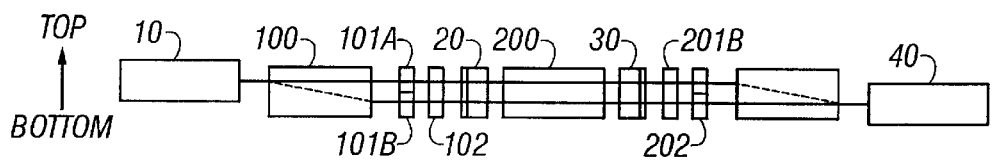
FIG. 20: Schematic depiction of side view (A) and top view (B) of 2×2 magneto-optical switch with internal prisms.
Figure 20B:
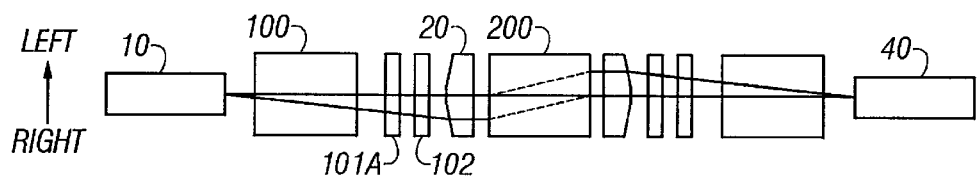
Figure 21A:
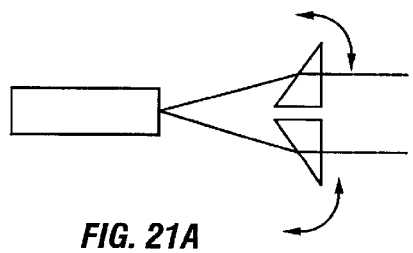
FIG. 21: Schematic side view of a portion of reflective optical switches having independently adjustable prisms.
Figure 21B:
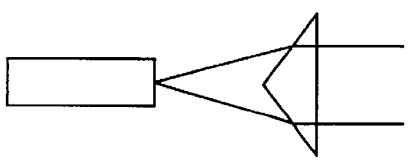
Figure 22A:
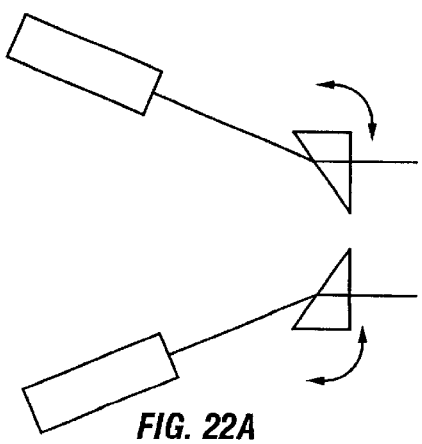
FIG. 22: Schematic side view of a portion of reflective optical switches having outwardly oriented independently adjustable prisms.
Figure 22B:
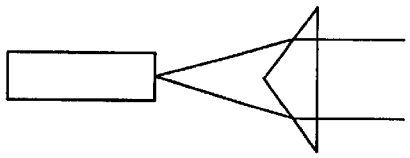

FIG. 19 depicts a 2×2 switch in the general form given by FIG. 5 with the addition of two double-slope prisms, 20, and two fiber collimators, 10. FIG. 20 is an alternative embodiment in which the prisms, 20, are placed inside the device, on either side of the central birefringent crystal, 200. FIGS. 21 and 22 are embodiments using two single slope prisms for independent control of the light beams.

1×4 Magneto-Optical Switch

Other embodiments of the present invention relate to 1×4 magneto-optical switching. Illustrative examples of these embodiments include two Faraday rotators (typically garnet single crystals, among other materials), three birefringent beam displacers (typically $YVO_4$, lithium niobate, among other materials), several wave-plates and a light beam reflector. An external magnetic field is applied to each of the Faraday rotators, typically by means of external electromagnetic coils. Reversing the direction of current flow in the external coils reverses the direction of the magnetic field applied to each Faraday rotator, in turn reversing the direction of rotation experienced by polarized light passing through the Faraday rotator.

Figure 26:
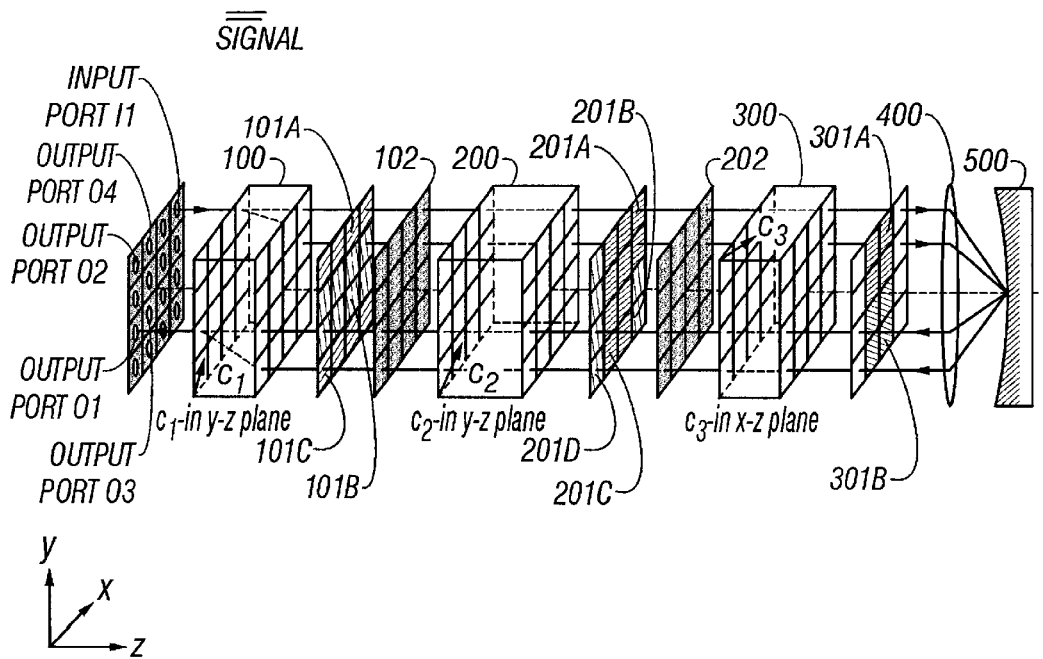
FIG. 26: Schematic side view of 1×4 switch.
Figure 27:
FIG. 27: Schematic end-on view of 1×4 switch of FIG. 26 with input port i! and four output ports, O1, O2, O3 and O4.

FIG. 26 depicts a typical configuration for a 1×4 switch. From left to right, the system comprises birefringent crystal 100, three half-wave plates, 101A, 101B, 101C, Faraday rotator 102, birefringent crystal 200, four half-wave plates, 201A, 201B, 201C, 201D, a second Faraday rotator 202, birefringent crystal 300, two half-wave plates 301A, 301B, focusing lens 400, and reflection mirror 500. The input port is denoted by I1 and the four output ports as O1, O2, O3 and O4 respectively. FIG. 27 depicts the input and output ports as seen for the perspective of left to right in FIG. 26. We use the notation that (i,j) denotes the (row, column) indices according to the convention of FIG. 27. That is, O1 is port (3,4), O2 is (1,4), and similarly for O3, O4 and other ports depicted in FIG. 27.

The switch depicted in FIG. 26 contains two Faraday rotators, 102 and 202. The rotation of the plane of polarization can be cw (+) or ccw (−) for each rotator, leading to four distinct switching modes. As noted above, the sense of rotation is defined from the perspective of the incident light beam, that is from left to right in FIG. 26. This convention is followed for the reflected beam travelling right to left following reflection by 500. That is, the reference is always along the left to right direction of FIG. 26 even though this is looking along the light beam in the forward traverse of the switch and looking counter to the light beam in the reverse traverse.

FIGS. 28A, 28B, 28C and 28D depict the paths taken by the incident light for the four switching modes I1→O1 (28A), I1→O2 (28B), I1→O3 (28C), I1→O4 (28D). The switching mode is determined by the direction of the magnetic fields applied to Faraday rotators 102 and 202. As described below, the function of switch depicted in FIG. 26 makes use of rotations of the planes of polarization by rotators 102 and 202 of ±45°. Table I summarizes the switching modes in terms of the rotations imposed by rotators 102 and 202.

TABLE I

|  | Faraday Rotators | |
| --- | --- | --- |
| Switching Mode | #102 | #202 |
| I1 → O1 | −45° | +45° |
| I1 → O2 | +45° | +45° |
| I1 → O3 | −45° | −45° |
| I1 → O4 | +45° | −45° |

The explanation of the 1×4 switch is facilitated by reference to Tables II and III which present the properties of the fixed optical elements, birefringent crystals 100, 200 and 300, as well as half-wave plates 101A, 101B, 101C, 201A, 201B, 201C and 201D.

TABLE II

| Birefringent Crystal | Polarization Direction of Light Beam | |
| --- | --- | --- |
| (as labeled in FIG. 26) | Ordinary | Extraordinary |
| 100 | Horizontal | Vertical |
| 200 | Horizontal | Vertical |
| 300 | Vertical | Horizontal |

TABLE III

| Half-Wave Plates (as labeled in FIG. 26) | Rotation of Polarization Plane* |
| --- | --- |
| 101A | +45° |
| 101B | −45° |
| 101C | +45° |
| 201A | +45° |
| 201B | −45° |
| 201C | +45° |
| 201D | −45° |
| 301A | +45° |
| 301B | −45° |

*The sense of rotation, + or −, is given for a light beam traversing the switch and the designated half-wave plate from left to right in FIG. 26. Returning beams, right to left travelling in FIG. 26 are rotated in the opposite sense (− or +) from that given in Table III.

Switching Mode I1→O1

Figure 28A:
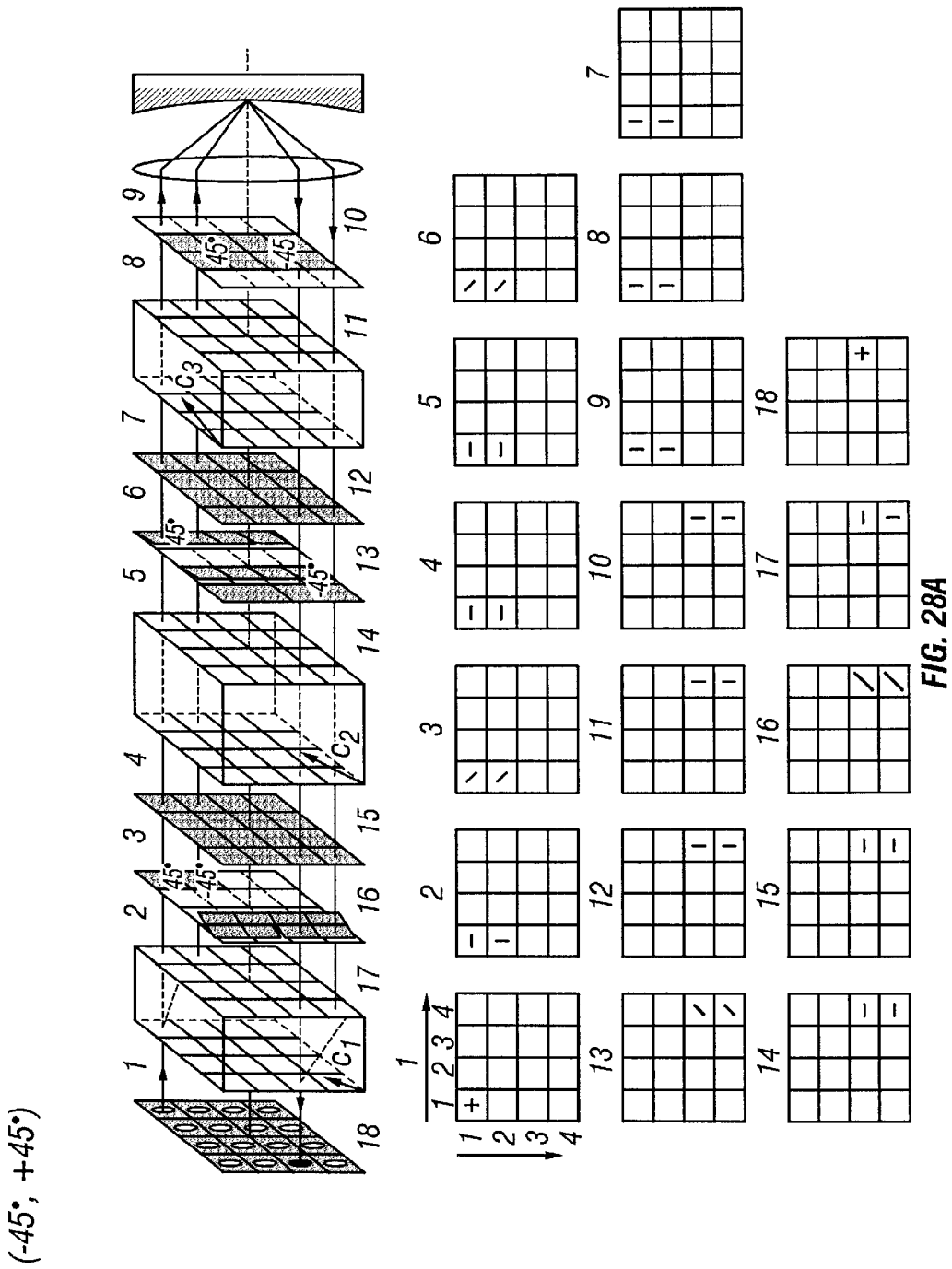
FIG. 28: Schematic side view depiction of 1×4 switch of FIG. 26 and position-polarization diagram for various switching modes: 28A, I1→O1. 28B, I1→O2. 28C, I1→O3. 28D, I1→O4.

FIG. 28A depicts the path of light for switching mode I1→O1 as the light traverses the various components of the switch in both forward and reverse directions. FIG. 28A also shows the position-polarization diagrams at locations (1), (2), . . . (18) through the switch viewed along the direction of the incident beam (left to right in FIG. 28A). We use the (i,j) (row, column) indices of FIG. 27 to indicate the location of light in the transverse plane perpendicular to the direction of light travel through the switch. Randomly polarized light incident on port (1,1) is decomposed into two orthogonal polarized beams by the action of birefringent crystal 100 (FIG. 26). The birefringent crystal is preferably $YV_{O4}$, as depicted in FIG. 28A, although other crystals are included within the scope of the present invention. The two orthogonal polorizations are displaced by a walk-off distance by crystal 100 such that the ordinary polarization (horizontal in FIG. 28A) remains in port (1,1) at location (2) while the extraordinary (vertical polarization) is displaced to port (2,1). The beams encounter half-wave plates 101A (1,1) and 101B (2,1) as identified by FIG. 26. These half-wave plates are configured such that the beam in port (1,1) is rotated by +45° (plate 101A) and that in port (2,1) is rotated −45° (plate 101B) leading to the position-polarizations following passage through half-wave plates, 101A and B shown in (3) of FIG. 28A. Faraday rotator, 102, has an applied magnetic field such that the planes of polarization of light passing through 102 experience a rotation of −45° as depicted in position-polarization diagram (4). Birefringent crystal 200 is configured such that the ordinary optical axis corresponds to horizontal polarization, thus passing the beams though undeflected to emerge at plane (5) unchanged from plane (4). The beams encounter half-wave plate 201A that is configured so as to rotate the planes of polarization by +45° resulting in the position-polarization of (6). Faraday rotator 202 is configured to rotate polarization by +45°, resulting in the position-polarization of (7). Birefringent crystal 300 is configured such that the ordinary beam polarization is vertical, resulting in no change in the beams of (7), emerging from crystal 300 as depicted in (8). As depicted in FIG. 26, half-wave plates 301A and 301B are located so as not to intersect beams in ports (1,1) or (2,1) leading to the position polarization depicted in (9).

The beams then encounter reflector 500 (typically after passage through focusing lens 400). The reflector 500 (plane or curved) is configured such that the beams incident thereon undergo both vertical and horizontal displacement. That is, beams (1,1), (2,1) in (9) become (4,4) and (3,4) respectively in (10). The return path of beams (4,4) and (3,4) does not intersect half-wave plates 301A or 301B, and passes through crystal 300 polarized in the ordinary (vertical) direction. Thus, beams (4,4) and (3,4) arrive at 12 unchanged from 10. Faraday rotator 202 rotates the plane of polarization by an additional +45° as depicted in (13).

The beams intersect half-wave plate 201D that rotates the planes of polarization by +45° on the reverse traverse of the switch (201D would cause −45° rotation were the beam to traverse 201D in the forward, left to right, direction). The position-polarization diagram of (14) results. The beams pass through crystal 200 with horizontal (ordinary) polarization, emerging undeflected at (15). Faraday rotator 102 causes another −45° rotation. Beam (4,4) encounters half-wave plate 101C that causes a polarization rotation of −45° for the reverse-traversing beam (4,4). Beam (3,4) encounters 101B and the polarization is rotated +45°. The position-polarization of (17) is the result.

The vertical polarization of beam (4,4) causes the walk-off depicted in FIG. 28A, leading to the recombined beam emerging in output port O1 (location (3,4)). Thus, FIG. 28A depicts the I1→O1 switching mode.

Switching Mode I1→O2

Figure 28B:
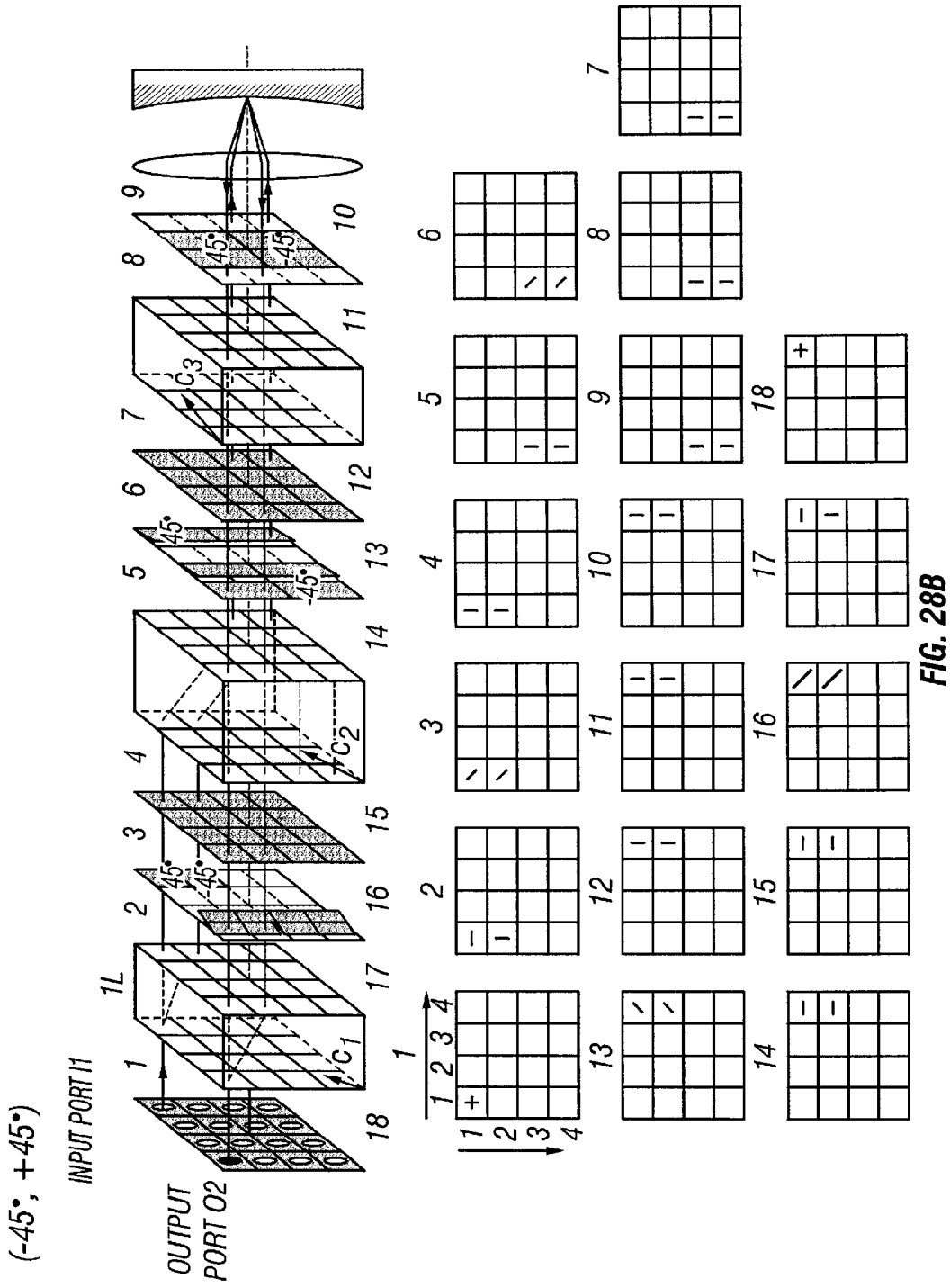

FIG. 28B depicts the path of light for switching mode I1→O2 as the light traverses the various components of the switch in both forward and reverse directions and the position-polarization diagrams at locations (1), (2), . . . (18) through the switch viewed along the direction of the incident beam (left to right in FIG. 28B). Randomly polarized light incident on port (1,1) is decomposed into two orthogonal polarized beams by the action of birefringent crystal 100 (FIG. 26). The two orthogonal polarizations are displaced by a walk-off distance by crystal 100 such that the extraordinary (vertical polarization) is displaced to port (2,1) before encountering half-wave plates 101A (1,1) and 101B (2,1).

These half-wave plates are configured such that the beam in port (1,1) is rotated by +45° (plate 101A) and that in port (2,1) is rotated −45° (plate 101B) leading to the position-polarizations of (3) in FIG. 28B. Faraday rotator, 102, has an applied magnetic field such that the planes of polarization of light passing through 102 experience a rotation of +45° (4). Birefringent crystal 200 is configured such that the ordinary optical axis corresponds to horizontal polarization, thus passing the beams though deflected by a walk-off distance to emerge at plane (5) in ports (3,1) and (4,1) respectively. A crystal of the same material as crystal 100, but having twice the optical path length, will be needed to effect beam displacement by the distance of two ports. However, any combination of refraction and crystal length resulting in the displacement depicted in (5) will suffice.

The beams next encounter half-wave plate 201B that is configured so as to rotate the planes of polarization by −45° resulting in the position-polarization of (6). Faraday rotator 202 is configured to rotate polarization by +45°, resulting in the position-polarization of (7). Birefringent crystal 300 is configured such that the ordinary beam polarization is vertical, resulting in no change in the beams of (7), emerging from crystal 300 as depicted in (8). As depicted in FIG. 26, half-wave plates 301A and 301B are located so as not to intersect beams in ports (3,1) or (4,1) leading to the position polarization depicted in (9).

The beams then encounter lens and reflector configured such that the beams incident thereon undergo both vertical and horizontal displacement, displacing to ports (2,4) and (1,4) in (10). The return path of beams (1,4) and (2,4) does not intersect half-wave plates 301A or 301B, and passes through crystal 300 polarized in the ordinary (vertical) direction arriving at (12) unchanged from (10). Faraday rotator 202 rotates the plane of polarization by an additional +45° as depicted in (13).

The beams intersect half-wave plate 201D that rotates the planes of polarization by +45° on the reverse traverse of the switch (201D would cause −45° rotation were the beam to traverse 201D in the forward, left to right, direction). The position-polarization diagram of (14) results. The beams pass through crystal 200 with horizontal (ordinary) polarization, emerging undeflected at (15). Faraday rotator 102 causes another +45° rotation. Beam (1,4) encounters half-wave plate 101A that causes a polarization rotation of −45° for the reverse-traversing beam (1,4). Beam (3,4) encounters 101B and the polarization is rotated +45°. The position-polarization of (17) is the result.

The vertical polarization of beam (2,4) causes the walk-off depicted in FIG. 28B, leading to the recombined beam emerging in output port O2 (location (1,4)). Thus, FIG. 28B depicts the I1→O2 switching mode Switching Mode I1→O3

Figure 28C:
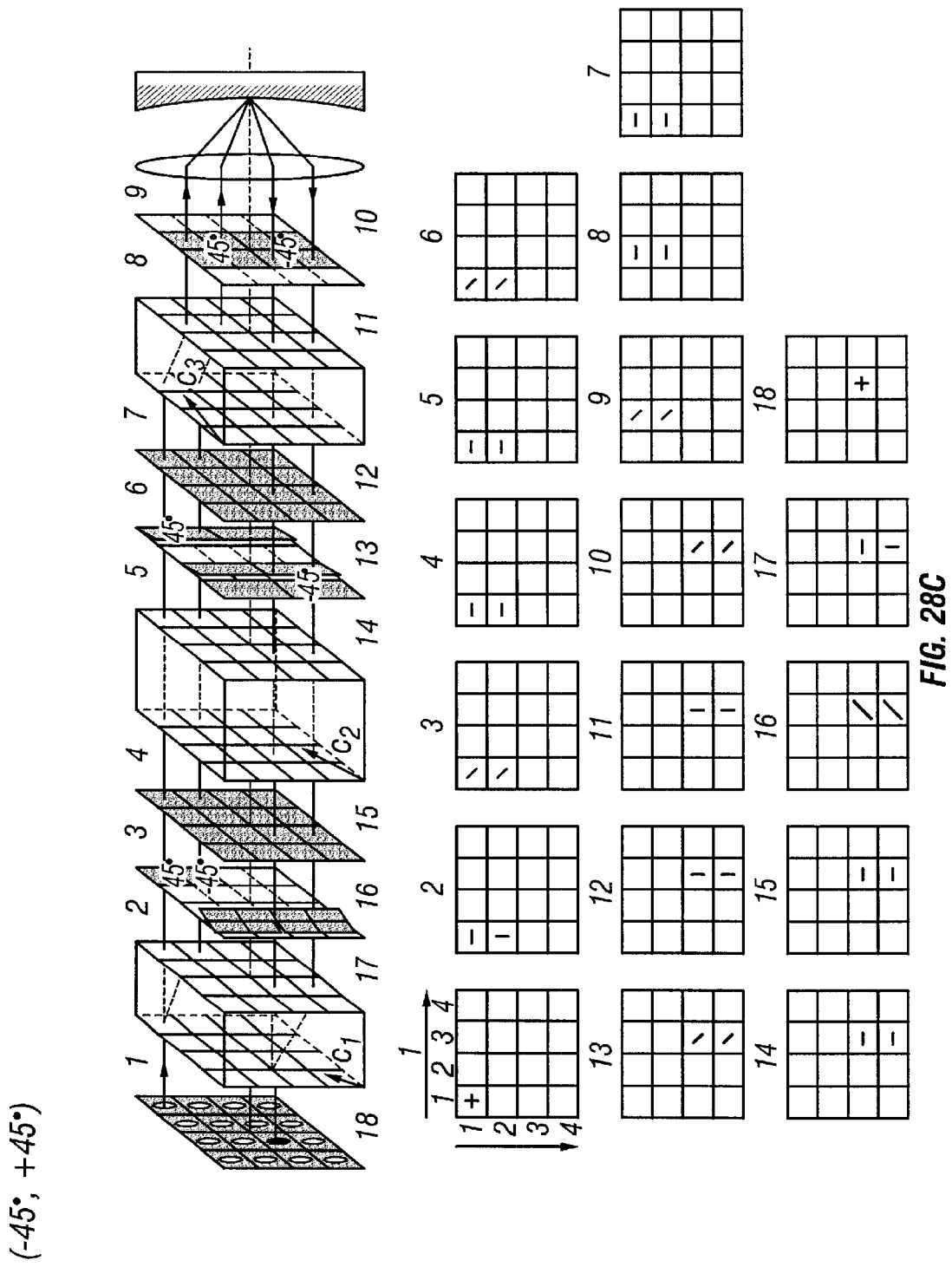

FIG. 28C depicts the path of light for switching mode I1→O3. Randomly polarized light incident on port (1,1) is decomposed into two orthogonal polarized beams and the extraordinary beam displaced by a walk-off distance by crystal 100 to port (2,1) before encountering half-wave plates 101A (1,1) and 101B (2,1). As before, the (1,1) beam is rotated by +45° and the (2,1) is rotated −45° leading to the position-polarizations of (3) in FIG. 28C. Faraday rotator, 102, has an applied magnetic field such that the planes of polarization of light passing through 102 experience a rotation of −45° (4). Birefringent crystal 200 passes the beams undeflected.

The beams next encounter half-wave plate 201A that is configured so as to rotate the planes of polarization by +45° resulting in the position-polarization of (6). Faraday rotator 202 is configured to rotate polarization by −45°, resulting in the position-polarization of (7). Birefringent crystal 300 is configured such that the ordinary beam polarization is vertical, resulting in a walk-off of beams (1,1) and (2,1). Crystal 300 has a configuration such that the walk-off is in the horizontal direction, to ports (1,2) and (2,2) respectively (8). Half-wave plate 301A rotates the plane of polarization by +45°, leading to the position polarization depicted in (9).

The beams then encounter lens and reflector configured, displacing to ports (4, 3) and (3,3) in (10). The return path of beams (3,3) and (4,3) intersects half-wave plate 301B, resulting in a rotation of +45° for the reverse-travelling beams (11) and passage through crystal 300 polarized in the ordinary (vertical) direction arriving at (12) unchanged from (11). Faraday rotator 202 rotates the plane of polarization by an additional −45° as depicted in (13).

The beams intersect half-wave plate 201C that rotates the planes of polarization by −45° on the reverse traverse of the switch. The position-polarization diagram of (14) results. The beams pass through crystal 200 with horizontal (ordinary) polarization, emerging undeflected at (15). Faraday rotator 102 causes another −45° rotation (16). Beam (3,3) encounters half-wave plate 101B that causes a polarization rotation of +45° for the reverse-traversing beam (3,3). Beam (4,3) encounters 101C and the polarization is rotated −45°. The position-polarization of (17) is the result.

The vertical polarization of beam (4,3) causes the walk-off depicted in FIG. 28C, leading to the recombined beam emerging in output port O3 (location (3,3)). Thus, FIG. 28C depicts the I1→O3 switching mode.

Switching Mode I1→O4

Figure 28D:
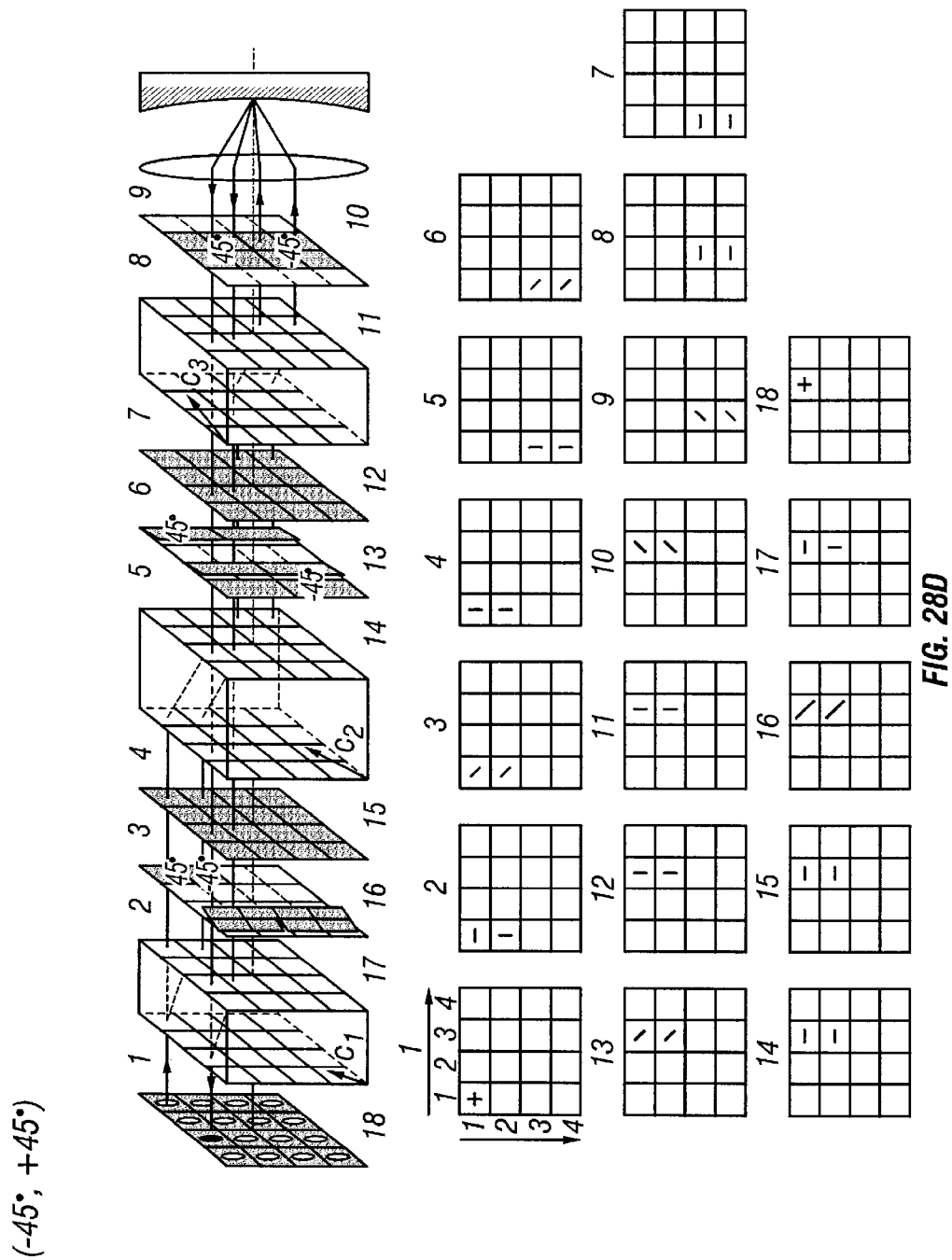

FIG. 28D depicts the path of light for switching mode I1→O4. Randomly polarized light incident on port (1,1) is decomposed into two orthogonal polarized beams and the extraordinary beam displaced by a walk-off distance by crystal 100 to port (2,1) before encountering half-wave plates 101A (1,1) and 101B (2,1). As before, the (1,1) beam is rotated by +45° and the (2,1) is rotated −45° leading to the position-polarizations of (3) in FIG. 28D. Faraday rotator, 102, has an applied magnetic field such that the planes of polarization of light passing through 102 experience a rotation of +45° (4). Birefringent crystal 200 passes the beams with a vertical displacement of two port locations as depicted in FIG. 28D (5). That is (1,1), (2,1) become (3,1) and (4,1) respectively (5).

The beams next encounter half-wave plate 201B that is configured so as to rotate the planes of polarization by −45° resulting in the position-polarization of (6). Faraday rotator 202 is configured to rotate polarization by −45°, resulting in the position-polarization of (7). Birefringent crystal 300 is configured such that the ordinary beam polarization is vertical, resulting in a walk-off of beams (3,1) and (4,1). Crystal 300 has a configuration such that the walk-off is in the horizontal direction, to ports (3,2) and (4,2) respectively (8). Half-wave plate 301B rotates the plane of polarization by −45°, leading to the position polarization depicted in (9).

The beams then encounter lens and reflector configured, displacing to ports (1, 3) and (2,3) in (10). The return path of beams (1,3) and (2,3) intersects half-wave plate 301A, resulting in a rotation of −45° for the reverse-travelling beams (11) and passage through crystal 300 polarized in the ordinary (vertical) direction arriving at 12 unchanged from 11. Faraday rotator 202 rotates the plane of polarization by an additional −45° as depicted in (13).

The beams intersect half-wave plate 201C that rotates the planes of polarization by −45° on the reverse traverse of the switch. The position-polarization diagram of (14) results. The beams pass through crystal 200 with horizontal (ordinary) polarization, emerging undeflected at (15). Faraday rotator 102 causes another +45° rotation (16). Beam (1,3) encounters half-wave plate 101A that causes a polarization rotation of −45° for the reverse-traversing beam (1,3). Beam (2,3) encounters 101B and the polarization is rotated +45°. The position-polarization of (17) is the result.

The vertical polarization of beam (2,3) causes the walk-off depicted in FIG. 28D, leading to the recombined beam emerging in output port O4 (location (1,3)). Thus, FIG. 28D depicts the I1→O4 switching mode.

Other Polarization Rotators

The descriptions of optical switches herein have made use of magneto-optical polarization rotators, Faraday rotators. Switching occurs by means of an external control signal causing the magnetic field applied to a magneto-optical material to change, thereby controlling the amount of polarization rotation and the switching. However, other polarization rotators may be used in some embodiments of the switches of the present invention. For example, liquid crystal polarization rotators control the amount of polarization rotation by controlling the electric field applied to the liquid crystal. However, several switches described above make use of light beams traversing the polarization rotator (or rotators) in a forward direction and, following retroreflection, traversing the rotator(s) in the reverse direction. Liquid crystal polarization rotators behave differently than Faraday rotators under such dual traverse, reversing the sense of rotation rather than doubling the rotation according to Eq. 3. Thus, rotators not behaving according to Eq. 3 are unsuitable for the dual traverse switches such as those described in connection with FIGS. 9, 10, 12, 15, 17, 23, 24, 26 and 28 but otherwise various polarization rotators in addition to Faraday rotators are included within the scope of the present invention.

Having described the invention in detail, those skilled in the art will appreciate that, given the present disclosure, modifications may be made to the invention without departing from the spirit of the inventive concept described herein. Therefore, it is not intended that the scope of the invention be limited to the specific and preferred embodiments illustrated and described.

We claim:
1. A 1×2 optical switch comprising:
   a) a light input port having a configuration to deliver input light to a first end of a first birefringent crystal, wherein said first birefringent crystal has a structure and orientation to separate said input light into a first ordinary beam and a first extraordinary beam and cause said first ordinary beam and said first extraordinary beam to emerge from the opposite second end of said first birefringent crystal separated by a walk-off distance; and,
   b) a first half-wave plate and a second half-wave plate located such that said first half-wave plate intersects said first ordinary beam and said second half-wave plate intersects said first extraordinary beam, wherein said first half-wave plate has a structure and configuration so as to rotate the plane of polarization of said first ordinary beam by 45° and said second half-wave plate has a structure and configuration so as to rotate the plane of polarization of said first extraordinary beam by 45° in the opposite sense of said rotation of said first half-wave plate such that upon emerging from said first half-wave plate and said second half-wave plate said first ordinary beam and said first extraordinary beam have parallel polarizations; and,
   c) a variable polarization rotator located so as to intersect said first ordinary beam and said first extraordinary beam following said first and said second half-wave plates, wherein said variable polarization rotator has the capability to rotate the plane of polarization by a first rotation or a second rotation as determined by the application of an external control signal to said variable polarization rotator, wherein said first rotation and said second rotation are positive and negative 45°; and,
   d) a second birefringent crystal located so as to intersect said first ordinary beam and said first extraordinary beam at a first end thereof following said variable polarization rotator, wherein said second birefringent has a structure and orientation such that;
      i) said first ordinary beam and said second ordinary beam pass through said second birefringent crystal undeflected when said control signal applied to said variable polarization rotator is such as to cause said first rotation and to emerge from the opposite, second end of said second birefringent as a second ordinary beam and a second extraordinary beam; and,
      ii) said first ordinary beam and said second ordinary beam pass through said second birefringent crystal and emerge from the second, opposite face of said second birefringent crystal as the third ordinary beam and the third extraordinary beam, separated by said walk-off distance, when said control signal applied to said variable polarization rotator is such as to cause said second rotation; and,
   e) a third half-wave plate having the location to intersect said second ordinary beam and having the structure and orientation so as to rotate by 90° the plane of polarization of light passing therethrough; and
   f) a fourth half-wave plate having the location to intersect said second extraordinary beam and said third ordinary beam and having the structure and orientation to rotate by 0° the plane of polarization of light passing therethrough; and,
   g) a fifth half-wave plate having the location to intersect said third extraordinary beam and having the structure and orientation to rotate by 90° the plane of polarization of light passing therethrough; and,
   h) a third birefringent crystal located so as to intersect on a first end thereof said second and third ordinary beams and said second and third extraordinary beams following said third, fourth and fifth half-wave plates, and having the structure and orientation so as to recombine said second ordinary beam and said second extraordinary beam at a first light output port, and to recombine said third ordinary beam and said third extraordinary beam at a second light output port, wherein said first and said second light output ports are spatially separate.
2. A 1×4 optical switch comprising:
   a) a light input port having a configuration to deliver input light to a first end of a first birefringent crystal, wherein said first birefringent crystal has a structure and orientation to separate said input light into a first ordinary beam and a first extraordinary beam and cause said first ordinary beam and said first extraordinary beam to emerge from the opposite second end of said first birefringent crystal separated by a walk-off distance; and, b) a first half-wave plate and a second half-wave plate located such that said first half-wave plate intersects said first ordinary beam and said second half-wave plate intersects said first extraordinary beam, wherein said first half-wave plate has a structure and configuration so as to rotate the plane of polarization of said first ordinary beam by 45° and said second half-wave plate has a structure and configuration so as to rotate the plane of polarization of said first extraordinary beam by −45°; and, c) a first variable polarization rotator located so as to intersect said first ordinary beam and said first extraordinary beam following said first and said second half-wave plates, wherein said first variable polarization rotator has the capability to rotate the plane of polarization by a first rotation or a second rotation as determined by the application of an external control signal to said first variable polarization rotator, wherein said first rotation and said second rotation are positive and negative 45°; and, d) a second birefringent crystal located so as to intersect said first ordinary beam and said first extraordinary beam at a first end thereof following said variable polarization rotator, wherein said second birefringent has a structure and orientation such that;
  i) said first ordinary beam and said second ordinary beam pass through said second birefringent crystal undeflected when said control signal applied to said variable polarization rotator is such as to cause said first rotation and to emerge from the opposite, second end of said second birefringent as a second ordinary beam and a second extraordinary beam; and,
  ii) said first ordinary beam and said second ordinary beam pass through said second birefringent crystal and emerge from the second, opposite face of said second birefringent crystal as the third ordinary beam and the third extraordinary beam, separated by said walk-off distance, when said control signal applied to said variable polarization rotator is such as to cause said second rotation; and, e) a third half-wave plate and a fourth half-wave plate located such that said third half-wave plate intersects said first ordinary and said first extraordinary beams following said first variable polarization rotator and said fourth half-wave plate intersects said second ordinary and said second extraordinary beams, wherein said first half-wave plate has a structure and orientation so as to rotate the plane of polarization of said first ordinary and extraordinary beams by 45° and said fourth half-wave plate has a structure and orientation so as to rotate the plane of polarization of said second ordinary and said second extraordinary beams by −45°; and, f) a second variable polarization rotator located so as to intersect said first and second ordinary beams and said first and second extraordinary beams following said third and fourth half-wave plates, wherein said second variable polarization rotator has the capability to rotate the plane of polarization by a first rotation or a second rotation as determined by the application of an external control signal to said second variable polarization rotator, wherein said first rotation and said second rotation are positive and negative 45°; and, g) a third birefringent crystal located so as to intersect said first and second ordinary beams and said first and second extraordinary beams at a first end thereof following said second variable polarization rotator, wherein said third birefringent has a structure and orientation such that;
  1) said first and second ordinary beams and said first and second extraordinary beams pass through said third birefringent crystal undeflected when said control signal applied to said second variable polarization rotator is such as to cause said first rotation and to emerge from the opposite, second end of said third birefringent as third, fourth, fifth and sixth ordinary beams; and,
  2) said first and second ordinary beams and said first and second extraordinary beams pass through said third birefringent crystal and emerge from the second, opposite face of said third birefringent crystal as the third, fourth, fifth and sixth extraordinary beams, separated by said walk-off distance, when said control signal applied to said second variable polarization rotator is such as to cause said second rotation; and, h) a fifth half-wave plate having the location to intersect said third ordinary beam following said third birefringent crystal and having the structure and orientation to rotate by 90° the plane of polarization of light passing therethrough; and, i) a sixth half-wave plate having the location to intersect said fourth ordinary beam and said third extraordinary beam following said third birefringent crystal and having the structure and orientation to rotate by 0° the plane of polarization of light passing therethrough; and, j) a seventh half-wave plate having the location to intersect said fifth ordinary beam and said fourth extraordinary beam following said third birefringent crystal and having the structure and orientation to rotate by 90° the plane of polarization of light passing therethrough; and, k) an eighth half-wave plate having the location to intersect said sixth ordinary beam and said fifth extraordinary beam following said third birefringent crystal and having the structure and orientation to rotate by 0° the plane of polarization of light passing therethrough; and, l) a ninth half-wave plate having the location to intersect said sixth extraordinary beam following said third birefringent crystal and having the structure and orientation to rotate by 90° the plane of polarization of light passing therethrough; and, m) a fourth birefringent crystal located so as to intersect on a first end thereof said third, fourth, fifth and sixth ordinary beams and said third, fourth, fifth and sixth extraordinary beams following said fifth, sixth, seventh and ninth half-wave plates, and having the structure and orientation so as to recombine said third ordinary beam and said fourth ordinary beam at a first light output port, and to recombine said fifth ordinary beam and said third extraordinary beam at a second light output port, and to recombine said fifth ordinary beam and said fourth extraordinary beam at a third light output port and to recombine said fifth extraordinary beam and said sixth extraordinary beam at a fourth light output port wherein said light output ports are spatially separate.

* * * * *

UNITED STATES PATENT AND TRADEMARK OFFICE
CERTIFICATE OF CORRECTION

PATENT NO.    : 6,493,139 B1
DATED         : December 10, 2002
INVENTOR(S)   : Liu et al.

It is certified that error appears in the above-identified patent and that said Letters Patent is hereby corrected as shown below:

<u>Title page,</u>
Please add: -- [73] Assignee: Primanex Corporation, Fremont, California -- under the "Inventors" section.

Signed and Sealed this

Twenty-ninth Day of April, 2003

JAMES E. ROGAN
*Director of the United States Patent and Trademark Office*